US012024284B2

(12) United States Patent
Asai et al.

(10) Patent No.: US 12,024,284 B2
(45) Date of Patent: Jul. 2, 2024

(54) INFORMATION PROCESSING DEVICE, INFORMATION PROCESSING METHOD, AND RECORDING MEDIUM

(71) Applicant: Panasonic Intellectual Property Corporation of America, Torrance, CA (US)

(72) Inventors: Katsuhiko Asai, Nara (JP); Kazunobu Konishi, Osaka (JP); Stephen William John, Nara (JP); Kazuo Inoue, Osaka (JP); Shunsuke Kuhara, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 328 days.

(21) Appl. No.: 17/201,585

(22) Filed: Mar. 15, 2021

(65) Prior Publication Data

US 2021/0221505 A1 Jul. 22, 2021

Related U.S. Application Data

(63) Continuation of application No. PCT/JP2019/047314, filed on Dec. 4, 2019.

(30) Foreign Application Priority Data

Feb. 15, 2019 (JP) .................. 2019-025843

(51) Int. Cl.
*B64C 39/02* (2023.01)
*B64U 101/30* (2023.01)
(Continued)

(52) U.S. Cl.
CPC ......... *B64C 39/024* (2013.01); *G05D 1/0038* (2013.01); *G06T 7/70* (2017.01);
(Continued)

(58) Field of Classification Search
CPC .............. B64C 39/024; B64U 2101/30; B64U 2201/20; G05D 1/0038; G06T 7/70; H04R 1/326
See application file for complete search history.

(56) References Cited

U.S. PATENT DOCUMENTS

2015/0016629 A1* 1/2015 Kanamori .............. H04R 1/326
 381/92
2017/0164103 A1* 6/2017 Shigenaga ........... H04N 23/661
(Continued)

FOREIGN PATENT DOCUMENTS

CN 107509026 A 12/2017
DE 10 2015 210 405 12/2016
(Continued)

OTHER PUBLICATIONS

Extended European Search Report issued on Feb. 22, 2022 in corresponding European Patent Application No. 19915167.1.
(Continued)

*Primary Examiner* — Ig T An
*Assistant Examiner* — Christine Nguyen Huynh
(74) *Attorney, Agent, or Firm* — Wenderoth, Lind & Ponack, L.L.P.

(57) ABSTRACT

A controller includes processor and memory. The memory stores (i) a captured image outputted from a camera in an unmanned aircraft and (ii) sound outputted from a directional microphone in the unmanned aircraft, and stores (i) a position and an orientation of the camera and (ii) a position and an orientation of the directional microphone. The processor obtains, from the memory, the captured image, the sound, the position and the orientation of the camera, and the position and the orientation of the directional microphone, calculates a sound pickup direction of the directional microphone using the position and the orientation of the camera and the position and the orientation of the directional microphone, superimposes an object indicating the sound pickup direction at a position, on the captured image, corresponding to the sound pickup direction calculated, and causes a display device to display the captured image on which the object is superimposed.

9 Claims, 14 Drawing Sheets

(51) Int. Cl.
*G05D 1/00* (2024.01)
*G06T 7/70* (2017.01)
*H04R 1/32* (2006.01)

(52) U.S. Cl.
CPC ......... *H04R 1/326* (2013.01); *B64U 2101/30* (2023.01); *B64U 2201/20* (2023.01)

(56) References Cited

U.S. PATENT DOCUMENTS

| | | | | |
|---|---|---|---|---|
| 2017/0220036 A1* | 8/2017 | Visser | ................. | H04R 29/004 |
| 2017/0280108 A1 | 9/2017 | Matsumoto et al. | | |
| 2018/0234612 A1* | 8/2018 | Kunkel | ................. | H04N 23/64 |

FOREIGN PATENT DOCUMENTS

| | | | | |
|---|---|---|---|---|
| EP | 1 946 606 | 11/2010 | | |
| JP | 2001-309233 | 11/2001 | | |
| JP | 2009-296232 A | 12/2009 | | |
| JP | 2010-21705 | 1/2010 | | |
| JP | 2017-175474 | 9/2017 | | |
| KR | 20110121303 A | * 11/2011 | ........... | H04N 13/398 |

OTHER PUBLICATIONS

International Search Report (ISR) issued on Jan. 7, 2020 in International (PCT) Application No. PCT/JP2019/047314.
Office Action and Search Report issued Jan. 12, 2024 in corresponding Chinese patent application No. 201980060463.8 with English translation of the Search Report, 13 pages.

* cited by examiner

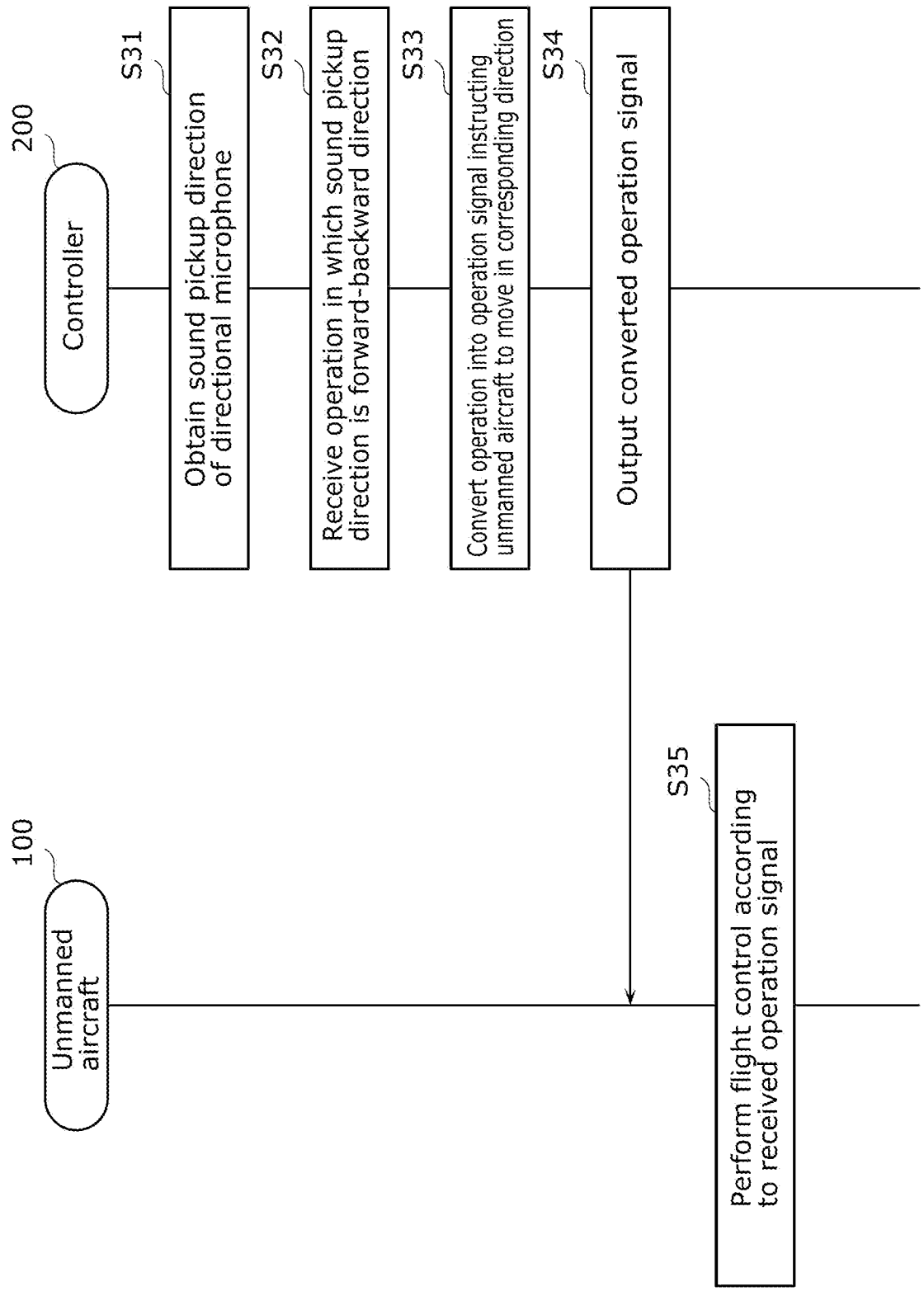

INFORMATION PROCESSING DEVICE, INFORMATION PROCESSING METHOD, AND RECORDING MEDIUM

CROSS REFERENCE TO RELATED APPLICATION(S)

This is a continuation application of PCT International Application No. PCT/JP2019/047314 filed on Dec. 4, 2019, designating the United States of America, which is based on and claims priority of Japanese Patent Application No. 2019-025843 filed on Feb. 15, 2019. The entire disclosures of the above-identified applications, including the specifications, drawings and claims are incorporated herein by reference in their entirety.

FIELD

The present disclosure relates to an information processing device, an information processing method, and a recording medium.

BACKGROUND

Patent Literature (PTL) 1 discloses a teleoperation system that causes a ground device to display an image, captured by an imaging device mounted on an unmanned helicopter operated by a ground user, on which angle information indicating an orientation of an optical system of the imaging device is superimposed.

CITATION LIST

Patent Literature

PTL 1: Japanese Unexamined Patent Application Publication No. 2001-309233

SUMMARY

Technical Problem

Unfortunately, the technology disclosed in PTL 1 is not intended for an unmanned aircraft with a built-in microphone that obtains sound. Sound cannot be recognized visually. For this reason, even if the image is provided, it is difficult for a person to operate the unmanned aircraft to pick up a target sound of good quality.

In view of this, the present disclosure provides an information processing device, an image processing method, and a recording medium that are capable of improving quality of sound picked up using an unmanned aircraft operated by a person.

Solution to Problem

An information processing device according to the present disclosure includes: a processor; and a memory, wherein the memory stores (i) a captured image outputted from a camera included in an unmanned aircraft and (ii) a sound outputted from a directional microphone included in the unmanned aircraft, and stores (i) a position and an orientation of the camera and (ii) a position and an orientation of the directional microphone, and the processor obtains, from the memory, the captured image, the sound, the position and the orientation of the camera, and the position and the orientation of the directional microphone, calculates a sound pickup direction of the directional microphone using the position and the orientation of the camera and the position and the orientation of the directional microphone, superimposes an object indicating the sound pickup direction at a position, on the captured image, corresponding to the sound pickup direction calculated, and causes a display device to display the captured image on which the object is superimposed.

It should be noted that general or specific aspects of the present disclosure may be implemented to a system, a method, an integrated circuit, a computer program, a computer-readable recording medium such as a Compact Disc-Read Only Memory (CD-ROM), or any given combination thereof.

Advantageous Effects

The information processing device, the image processing method, and the recording medium according to the present disclosure are capable of improving quality of sound picked up using an unmanned aircraft operated by a person.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 19 is a sequence illustrating an example of an operation performed by the unmanned aircraft and the controller in an operation conversion process of the unmanned aircraft according to the embodiment.

Figure 1:
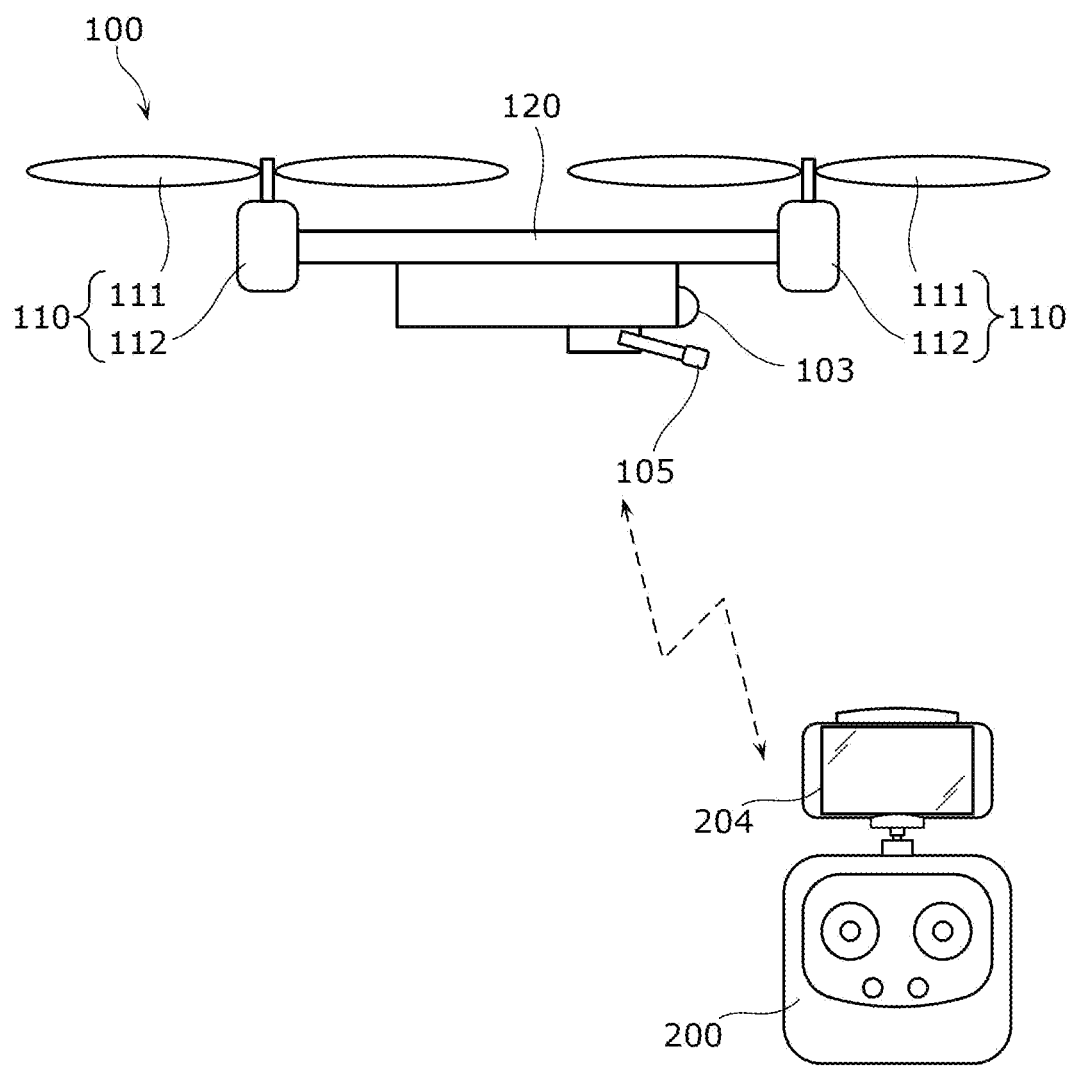
FIG. 1 illustrates an external view of an unmanned aircraft and a controller according to an embodiment.

DESCRIPTION OF EMBODIMENT (Underlying Knowledge Forming Basis of the Present Disclosure)

In recent years, a study has been made to use an unmanned aircraft, provided with a propeller to develop a thrust force in flight, as a mobile communication tool to pick up sound. A microphone mounted on such unmanned aircraft picks up not only a target sound, but also noise, mainly wind noise by the propeller, caused by this unmanned aircraft itself. To reduce the noise to be picked up, a directional microphone may be used to pick up sound.

For the directional microphone mounted on the unmanned aircraft that flies over, it is desirable to be fixed to an airframe of the unmanned aircraft to aim obliquely downward from the airframe. With this, a sound pickup range of the directional microphone is oriented toward a sound source of the target sound. Moreover, in view of reducing the unmanned aircraft in weight, a small number of directional microphones may be mounted. In this case, the sound pickup range of these directional microphones is limited to a specific range. Thus, the airframe is to be moved to a position where the sound source is within the sound pickup range of the directional microphones.

Here, the technology disclosed in PTL 1 enables the ground device to display the image, captured by the imaging device, on which the angle information indicating the orientation of the optical system of the imaging device is superimposed. This image displayed together with the angle information enhances operability of the imaging device as well as operability of the mobile vehicle.

However, the technology disclosed in PTL 1 is not intended for an unmanned aircraft with a built-in microphone that obtains sound. On this account, it is difficult to determine whether a sound source is within a sound pickup range of a directional microphone. It is thus also difficult to move the unmanned aircraft to a position where the sound source is within the sound pickup range of the directional microphone.

In order to solve the above problems, an information processing device according to an aspect of the present disclosure includes: a processor; and a memory, wherein the memory stores (i) a captured image outputted from a camera included in an unmanned aircraft and (ii) a sound outputted from a directional microphone included in the unmanned aircraft, and stores (i) a position and an orientation of the camera and (ii) a position and an orientation of the directional microphone, and the processor obtains, from the memory, the captured image, the sound, the position and the orientation of the camera, and the position and the orientation of the directional microphone, calculates a sound pickup direction of the directional microphone using the position and the orientation of the camera and the position and the orientation of the directional microphone, superimposes an object indicating the sound pickup direction at a position, on the captured image, corresponding to the sound pickup direction calculated, and causes a display device to display the captured image on which the object is superimposed.

Thus, the display device displays the captured image on which the object indicating the sound pickup direction of the directional microphone is superimposed at the position corresponding to the calculated sound pickup direction on the captured image outputted from the camera of the unmanned aircraft. As a result, the user is able to find the position of the sound pickup direction of the directional microphone on the captured image. More specifically, the sound pickup direction of the directional microphone can be visualized. Thus, while viewing the image displayed on the display device, the user is able to easily orient the sound pickup direction of the directional microphone toward the sound source by operating the unmanned aircraft to align the object with the sound source of the target sound. This enhances the quality of sound picked up using the unmanned aircraft operated by a person.

It is possible that the processor calculates, as the sound pickup direction, a base direction in which the directional microphone picks up the sound.

Thus, while viewing the image displayed on the display device, the user is able to easily orient the base direction, in which the directional microphone picks up the sound, toward the sound source by operating the unmanned aircraft to align the object with the sound source. This enhances the quality of sound picked up using the unmanned aircraft operated by a person.

It is also possible that the processor further obtains a measured distance measured to a subject captured in the captured image, further calculates a sound pickup range of the directional microphone at a position of the subject, using the sound pickup direction calculated and the measured distance obtained, and superimposes an object indicating the sound pickup range calculated, as the object indicating the sound pickup direction, on the captured image.

Thus, while viewing the image displayed on the display device, the user is able to easily keep the sound source within the sound pickup range of the directional microphone by operating the unmanned aircraft to align the object with the sound source. This enhances the quality of sound picked up using the unmanned aircraft operated by a person.

It is further possible that the processor establishes an association between a movement direction of the unmanned aircraft and the sound pickup direction, and controls movement of the unmanned aircraft based on a result of the association.

Thus, the movement of the unmanned aircraft is controlled in a direction with respect to the sound pickup direction. This enables the unmanned aircraft to move while keeping the sound pickup direction of the directional microphone toward the sound source.

It is still further possible that the processor receives an operation input relating to the movement of the unmanned aircraft, and controls the movement of the unmanned aircraft by converting the operation input based on the result of the association.

Thus, the user is able to easily move the unmanned aircraft in a direction with respect to the sound pickup direction. This enables the user to move the unmanned aircraft while keeping the sound pickup direction of the directional microphone toward the sound source.

It is still further possible that when the sound pickup direction calculated is outside an imaging range of the camera, the processor superimposes, on the captured image, an object pointing toward the sound pickup direction from the imaging range.

Thus, while viewing the image displayed on the display device, the user is able to easily orient the sound pickup direction of the directional microphone toward the sound source by operating the unmanned aircraft to orient the unmanned aircraft in the direction indicated by the object. This enhances the quality of sound pickup.

It is still further possible that the processor further obtains a setting distance corresponding to quality of sound pickup of the directional microphone, and controls a presentation manner of the object indicating the sound pickup direction in accordance with a difference between the measured distance obtained to the subject in the captured image and the setting distance obtained.

Thus, the display device is able to display the object in the presentation manner that is different depending on whether the quality of sound pickup is assumed to be high or low according to the distance from the subject to the directional microphone. Thus, while viewing the image displayed on the display device, the user is able to operate the unmanned aircraft so that the object is displayed in the presentation manner with the high quality. This enhances the quality of sound pickup for the target sound obtained from the directional microphone.

It is still further possible that the processor maintains the presentation manner of the object indicating the sound pickup direction when the difference is greater than or equal to a threshold value or when a subject is not present in a range where the measured distance is measurable.

If the quality of sound pickup is a predetermined quality or lower, the presentation manner of the object is maintained. This can reduce a processing load of changing the presentation manner.

It should be noted that general or specific aspects of the present disclosure may be implemented to a system, a method, an integrated circuit, a computer program, a computer-readable recording medium such as a Compact Disc-Read Only Memory (CD-ROM), or any given combination thereof.

Hereinafter, the unmanned aircraft according to an aspect of the present invention will be described in detail with reference to the drawings.

The following embodiments are specific examples of the present disclosure. The numerical values, shapes, materials, elements, arrangement and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements.

Embodiment

Figure 2:
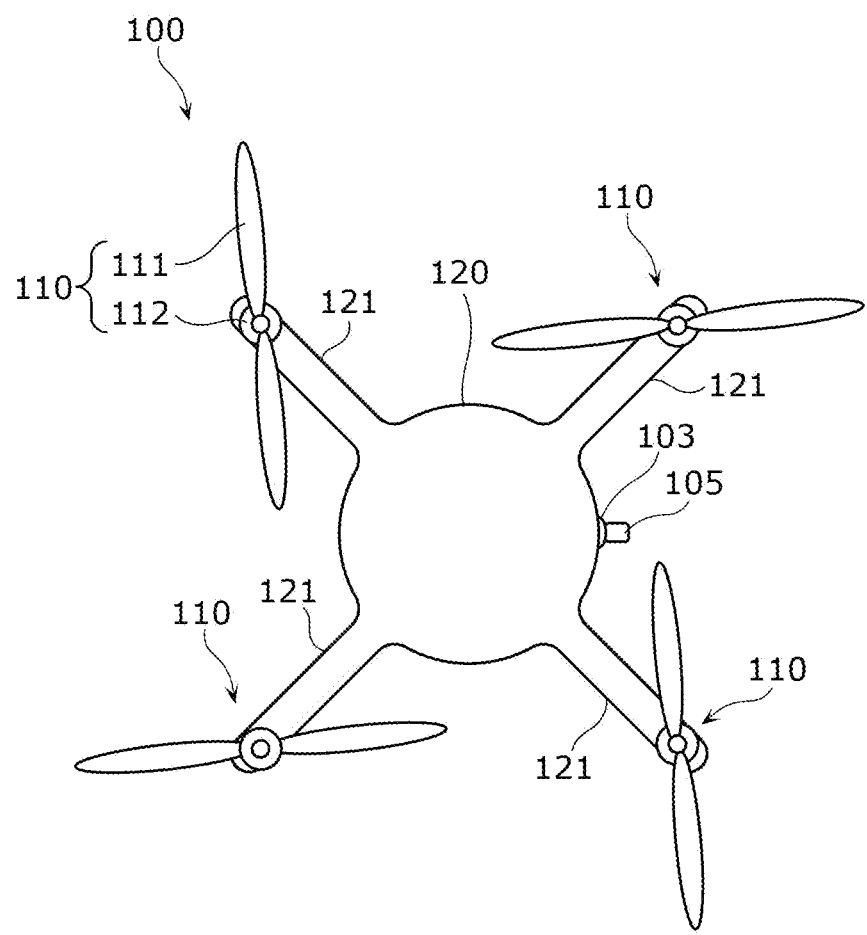
FIG. 2 is a top view of the unmanned aircraft according to the embodiment.

The following describes an embodiment.
[1. Configuration]
FIG. 1 illustrates an external view of an unmanned aircraft and a controller according to the embodiment. FIG. 2 is a top view of the unmanned aircraft according to the embodiment.

As illustrated in FIG. 1 and FIG. 2, unmanned aircraft 100 receives, from controller 200, an operation signal based on an operation input (hereinafter, also referred to as the "operation") to controller 200 from the user. Unmanned aircraft 100 flies according to the received operation signal. During flight, unmanned aircraft 100 may capture an image using camera 103 included in unmanned aircraft 100, according to the received operation signal. The image captured by camera 103 may be transmitted to controller 200 or a mobile terminal, such as a smartphone.

Receiving the operation from the user, controller 200 transmits the operation signal based on the received operation to unmanned aircraft 100. Controller 200 includes display 204. Display 204 displays the captured image received from unmanned aircraft 100, for example. Note that controller 200 may be connected to a mobile terminal, such as a smartphone, and use a display of the mobile terminal as display 204.

Thus, while visually verifying in real time the image captured by camera 103 of unmanned aircraft 100 and displayed on display 204 of controller 200, the user can operate controller 200 to change a flight state, which is at least one of position or orientation of unmanned aircraft 100 during flight. This allows the user to freely change an imaging range of camera 103 of unmanned aircraft 100.

Unmanned aircraft 100 includes four generators 110, airframe 120, and four arms 121.

Each of generators 110 generates a force to fly unmanned aircraft 100. To be more specific, each of generators 110 produces an airflow to generate the force to fly unmanned aircraft 100. Each of generators 110 includes: rotor 111 that rotates to generate an airflow; and actuator 112 that rotates rotor 111. Rotor 111 and actuator 112 have rotation axes roughly parallel to each other in a vertical direction, and generate an airflow flowing downward from above rotor 111. Thus, four generators 110 generate a thrust force for unmanned aircraft 100 to ascend and also generate a force for unmanned aircraft 100 to fly. Actuator 112 is a motor that rotates about the rotation axis of rotor 111, for example.

When viewed from above, four generators 110 are arranged at angular intervals of 90 degrees around a barycenter of airframe 120. To be more specific, four generators 110 are arranged circularly to encompass airframe 120.

Rotor 111 provided for each of generators 110 includes one propeller as illustrated. However, this is not intended to be limiting. Rotor 111 may include two contra-rotating propellers that rotate about the same rotation axis in opposite directions. Moreover, the number of generators 110 may be less than four, or five or more, if unmanned aircraft 100 is flyable.

Airframe 120 is a cylindrical box-like component for example, or more specifically, a housing. Airframe 120 contains electronic devices including a processor, a memory, a battery, and various sensors. The shape of airframe 120 is not limited to a cylinder, and may be a box-like shape in a different form, such as a quadrangular prism.

Camera 103 and directional microphone 105 are disposed outside airframe 120. For example, when unmanned aircraft 100 is viewed from above, directional microphone 105 is fixed to airframe 120 to face a direction between two generators 110 adjacent to each other among four generators 110 arranged circularly. More specifically, with airframe 120 being the center, directional microphone 105 is disposed to face in a direction shifted by 45 degrees with respect to a direction in which generator 110 is located. Directional microphone 105 is fixed to airframe 120 to face forward of unmanned aircraft 100, for example. Moreover, directional microphone 105 is fixed to airframe 120 to face obliquely downward when unmanned aircraft 100 is viewed from a horizontal direction.

Each of four arms 121 extends from airframe 120 toward a corresponding one of generators 110, and has an end fixed to the corresponding one of generators 110. To be more specific, each of arms 121 has one end fixed to airframe 120 and the other end fixed to the corresponding one of generators 110.

Figure 3:
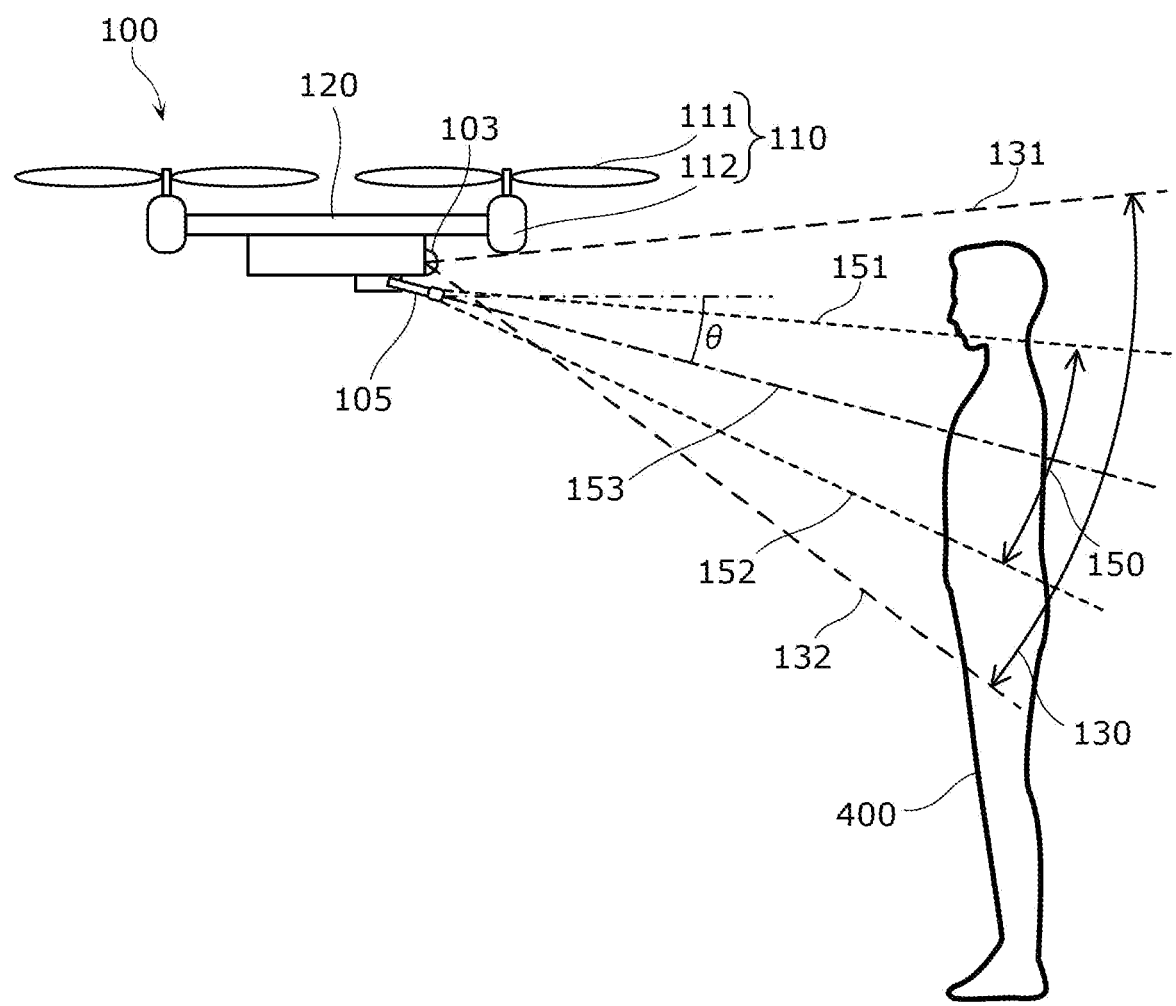
FIG. 3 illustrates an imaging range of a camera of the unmanned aircraft, as well as a sound pickup direction of a directional microphone.

FIG. 3 illustrates an imaging range of the camera of the unmanned aircraft, as well as a sound pickup direction of the directional microphone.

As illustrated in FIG. 3, camera 103 is fixed to airframe 120 to capture an image within imaging range 130 extending obliquely downward from the horizontal direction. Imaging range 130 is roughly square pyramidal and has an apex at a position of camera 103, for example. Imaging range 130 is defined by an angular range from range upper limit 131 to range lower limit 132 in horizontal plan view. Directional microphone 105 is fixed to airframe 120 to face in sound pickup direction 153 directed obliquely downward by 0 degrees from the horizontal direction. Sound pickup range 150 of directional microphone 105 is roughly a cone in shape, having sound pickup direction 153 as a central axis and also having an apex at a position of directional microphone 105. Sound pickup range 150 is defined by an angular range from range upper limit 151 to range lower limit 152 in horizontal plan view. In horizontal plan view, the angular range of sound pickup range 150 may be narrower than an angle of view defining the imaging range of camera 103.

Figure 4:
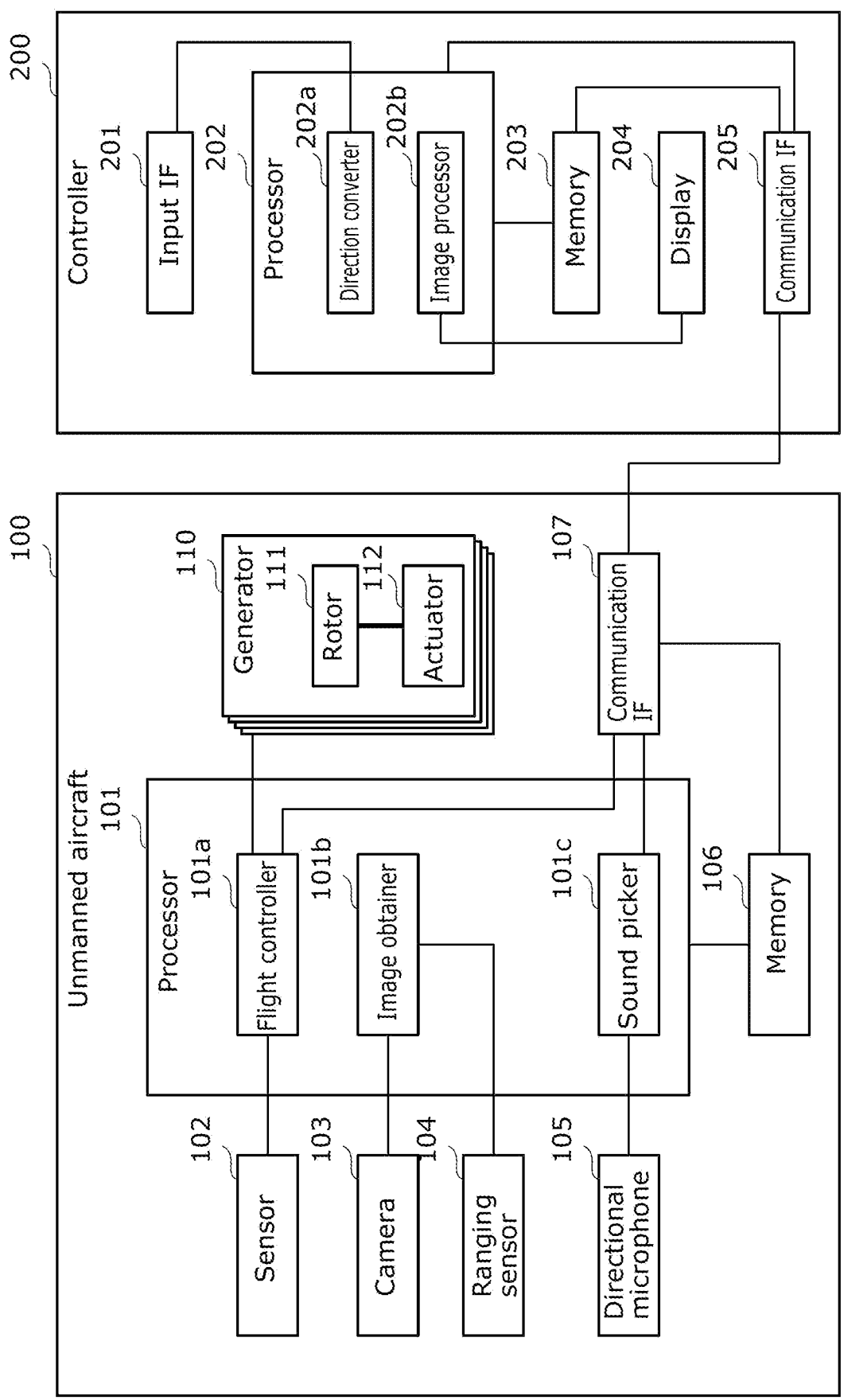
FIG. 4 is a block diagram illustrating configurations of the unmanned aircraft and the controller according to the embodiment.

FIG. 4 is a block diagram illustrating configurations of the unmanned aircraft and the controller according to the embodiment. More specifically, FIG. 4 is a block diagram illustrating hardware configurations of unmanned aircraft 100 and controller 200 as well as functions of processors 101 and 202.

Unmanned aircraft 100 is first described. Unmanned aircraft 100 includes processor 101, sensor 102, camera 103, ranging sensor 104, directional microphone 105, memory 106, communication interface (IF) 107, and four generators 110.

Processor 101 obtains detection results from various sensors including sensor 102, an image sensor of camera 103, ranging sensor 104, and directional microphone 105 and also obtains a reception result from communication IF 107, for example. In response to the obtained detection results or reception result, processor 101 performs a corresponding process by executing a predetermined program stored in memory 106 or a storage that is not shown. In this case, processor 101 controls at least one of camera 103, communication IF 107, and four generators 110.

Sensor 102 includes an acceleration sensor, a gyroscope sensor, an atmospheric pressure sensor, a geomagnetic sensor, and a global positioning system (GPS) receiver, for example.

The acceleration sensor detects an acceleration of unmanned aircraft 100 for each of three different directions. The acceleration sensor is an example of an orientation sensor that detects an orientation of unmanned aircraft 100.

The gyroscope sensor detects an angular speed for each rotation about three axes along the three different directions of unmanned aircraft 100. The gyroscope sensor is an example of the orientation sensor that detects the orientation of unmanned aircraft 100.

The atmospheric pressure sensor detects an atmospheric pressure of an environment around unmanned aircraft 100.

The geomagnetic sensor detects a direction in which a base direction of unmanned aircraft 100 is facing. The base direction may be a forward direction of unmanned aircraft 100, for example. The geomagnetic sensor is an example of the orientation sensor that detects the orientation of unmanned aircraft 100.

The GPS receiver receives information indicating a position of this GPS receiver from an artificial satellite that includes a GPS satellite. To be more specific, the GPS receiver detects a current position of unmanned aircraft 100. The artificial satellite that transmits the information to be received by the GPS receiver is not limited to the GPS satellite, and may be any satellite designed for a global navigation satellite system (GNSS).

Camera 103 is a device that includes an optical system, such as a lens, and the image sensor. An orientation of camera 103 relative to airframe 120 may be fixed or changed freely. In the latter case, camera 103 may be supported by a gimbal (not shown) that keeps a triaxial orientation of camera 103 constant. Even if the orientation of unmanned aircraft 100 changes, the gimbal maintains a desirable orientation of camera 103 with respect to, for example, a terrestrial coordinate system. Here, the desirable orientation may be defined by an imaging direction of camera 103 that is included in the operation signal received from controller 200.

Ranging sensor 104 detects a distance between ranging sensor 104 and a near subject. For example, ranging sensor 104 may be provided for each pixel of the image sensor of camera 103. In this case, camera 103 is a depth camera, for example. Ranging sensor 104 may be an ultrasonic sensor, a time-of-flight (TOF) camera, or a light detection and ranging (LIDAR) sensor.

Directional microphone 105 has a property of being able to pick up higher-quality sound within a sound pickup range having a predetermined angular range with respect to a specific direction (hereinafter, this direction is referred to as the sound pickup direction) than within an angular range outside the sound pickup range. To be more specific, directional microphone 105 is a microphone having directivity. The predetermined angular range is 90 degrees or less, and is a three-dimensional angular range extending from a position of directional microphone 105. For example, the three-dimensional angular range is roughly a cone in shape, centering on the sound pickup direction and increasing in diameter as a distance from the position of directional microphone 105 increases. Directional microphone 105 may be a microphone array including a plurality of microphone elements. Directional microphone 105 picks up sound to generate sound data and then outputs the generated sound data.

Memory 106 stores, for example: information indicating a position and an orientation of camera 103 with respect to airframe 120 of unmanned aircraft 100; information indicating a position and an orientation of directional microphone 105 with respect to airframe 120; information indicating a sound pickup direction, a sound pickup range, and a sound-pickup recommended distance of directional microphone 105; and information indicating a position and an orientation of ranging sensor 104 with respect to airframe 120. Memory 106 may store a program to be executed by processor 101. Memory 106 is implemented by a nonvolatile memory, for example.

Communication IF 107 is a communication interface that communicates with controller 200 or a communication terminal. Communication IF 107 includes a communication interface for receiving a transmission signal from controller 200, for example. Communication IF 107 may be a wireless local area network (LAN) interface that meets IEEE 802.11a, 11b, 11g, 11n, 11ac, and 11ax standards, or may be an interface that meets Bluetooth (registered trademark) standard, for example.

Four generators 110 are described above, and thus detailed description is omitted here.

Processor 101 includes functional components including flight controller 101a, image obtainer 101b, and sound picker 101c. More specifically, each of functions performed by flight controller 101a, image obtainer 101b, and sound picker 101c is implemented by processor 101 executing a program stored in memory 106.

Flight controller 101a controls the number of revolutions of actuator 112 of generator 110, based on: the current position, a flight speed, and a flight orientation of unmanned aircraft 100 that are detected by sensor 102; and an operation signal received by communication IF 107 from controller 200. Thus, flight controller 101a controls a flight state of unmanned aircraft 100. More specifically, controller 101a controls the flight state of unmanned aircraft 100 according to the operation signal outputted from controller 200 in response to an operation performed on controller 200 by the user. In other words, flight controller 101a functions as a flight controller, for example.

Image obtainer 101b obtains a captured image captured by camera 103. Image obtainer 101b sequentially obtains the captured image from camera 103 in a first sampling cycle. Here, image obtainer 101b may associate the captured image with a timing at which this captured image is captured by camera 103. Moreover, image obtainer 101b obtains a measured distance measured by ranging sensor 104 from unmanned aircraft 100 to a subject near unmanned aircraft 100. Image obtainer 101b sequentially obtains the measured distance from ranging sensor 104 in a second sampling cycle. Here, image obtainer 101b may associate the measured distance with a timing at which this measured distance is measured by ranging sensor 104. Image obtainer 101b associates the captured image with the measured distance in accordance with the captured image and the measured distance that are obtained at the timings corresponding to each other. To be more specific, image obtainer 101b associates a region, which is among a plurality of regions on the captured image, with a measured distance to a subject captured in the region. The plurality of regions on the captured image may be a plurality of pixels included in the captured image, or a plurality of blocks included in the captured image.

For a depth camera including a combination of camera 103 and ranging sensor 104, the first sampling cycle and the second sampling cycle have the same sampling cycle and the sampling timings match between these cycles. In this case, the measured distance associated with the corresponding pixel of the captured image is obtained. This allows the captured image and the measured distance to be easily associated with each other using the captured image and the measured distance.

In contrast, if camera 103 and ranging sensor 104 are separate components, the first sampling cycle and the second sampling cycle are different and the sampling timings often do not match between these cycles. In this case, image obtainer 101b may associate a captured image captured by camera 103 with a measured distance that is measured by ranging sensor 104 at the timing closest to the timing at which this captured image is captured, for example. Note that this is not intended to be limiting if the first sampling cycle and the second sampling cycle synchronize with each other. In this case, the captured image captured by camera 103 is associated with the measured distance measured by ranging sensor 104 at the synchronized timing.

Image obtainer 101b associates the captured image with the measured distance, based on the captured image captured by camera 103, the measured distance to the subject measured by ranging sensor 104, the information stored in memory 106 to indicate the position and the orientation of camera 103, and the information stored in memory 106 to indicate the position and the orientation of ranging sensor 104.

Image obtainer 101b outputs a distance image, which is a result of associating the captured image with the measured distance, to controller 200 via communication IF 107. Image obtainer 101b may sequentially generate the distance image using the captured image and the measured distance obtained sequentially, and then sequentially output the sequentially generated distance image to controller 200. This enables unmanned aircraft 100 to output the distance image to controller 200 in real time.

Note that image obtainer 101b may further associate the distance image with the timing at which the captured image, based on which the distance image is generated, is captured by camera 103. Moreover, the captured image obtained by image obtainer 101b from camera 103 may be stored into memory 106. The measured distance obtained by image obtainer 101b may be stored into memory 106. Furthermore, the distance image indicating the result of the association established by image obtainer 101b may be stored into memory 106.

Sound picker 101c executes a sound pickup process using directional microphone 105 to obtain sound data sequentially generated by directional microphone 105, according to a sound pickup instruction received by communication IF 107 from controller 200. Sound picker 101c may associate the sound data with a timing at which this sound data is generated by directional microphone 105. The sound data obtained by sound picker 101c may be stored into memory 106 or outputted to controller 200 via communication IF 107.

Next, controller 200 is described. Controller 200 includes input interface (IF) 201, processor 202, memory 203, display 204, and communication interface (IF) 205. Controller 200 is an example of an information processing device.

Input IF 201 receives an operation from the user and outputs an operation signal based on the received operation to processor 202. Input IF 201 receives an operation related to movement of unmanned aircraft 100 from the user. The operation related to movement of unmanned aircraft 100 includes an instruction indicating a direction in which unmanned aircraft 100 is to move and a movement speed in this direction, for example. This operation causes unmanned aircraft 100 to move in the specified direction at the specified movement speed. Note that the operation related to movement of unmanned aircraft 100 may include an instruction indicating a direction in which unmanned aircraft 100 is to move and a movement distance in this direction, for example. For example, input IF 201 is a control pad that includes: arrow keys or a lever to receive an operation indicating a direction in which unmanned aircraft 100 is to move or indicating rotation of unmanned aircraft 100; and buttons to receive operations to achieve various functions.

Processor 202 obtains the operation signal based on the operation received by input IF 201 and also obtains a reception result from communication IF 205, for example. In response to the obtained operation signal or reception result, processor 202 performs a corresponding process by executing a predetermined program stored in memory 203 or a storage that is not shown. In this case, processor 202 controls at least one of display 204 and communication IF 205.

Memory 203 stores programs to be executed by processor 202. Moreover, memory 203 stores the distance image and the sound data that are outputted from unmanned aircraft 100 and obtained via communication IF 205. Furthermore, memory 203 may store, for example: information indicating a position and an orientation of camera 103 with respect to airframe 120 of unmanned aircraft 100; information indicating a position and an orientation of directional microphone 105 with respect to airframe 120; information indicating a sound pickup direction, a sound pickup range, and a sound-pickup recommended distance of directional microphone 105; and information indicating a position and an orientation of ranging sensor 104 with respect to airframe 120. Memory 203 may obtain these sets of information from unmanned aircraft 100 via communication IF 205 and store these obtained sets of information. Memory 203 is implemented by a nonvolatile memory, for example.

Display 204 displays the captured image outputted by processor 202. Display 204 is an example of a display device. For example, display 204 is implemented by a liquid crystal display or an organic electroluminescence (EL) display.

Communication IF 205 is a communication interface that communicates with unmanned aircraft 100. Communication IF 205 includes a communication interface for transmitting a transmission signal to unmanned aircraft 100 and a communication interface for receiving a transmission signal from unmanned aircraft 100, for example. Communication IF 205 may be a wireless local area network (LAN) interface that meets IEEE 802. 11a, 11b, 11g, 11n, 11ac, and 11ax standards, or may be an interface that meets Bluetooth (registered trademark) standard, for example.

Processor 202 includes functional components including direction converter 202a and image processor 202b. More specifically, each of functions performed by direction converter 202a and image processor 202b is implemented by processor 202 executing a program stored in memory 203.

Figure 5:
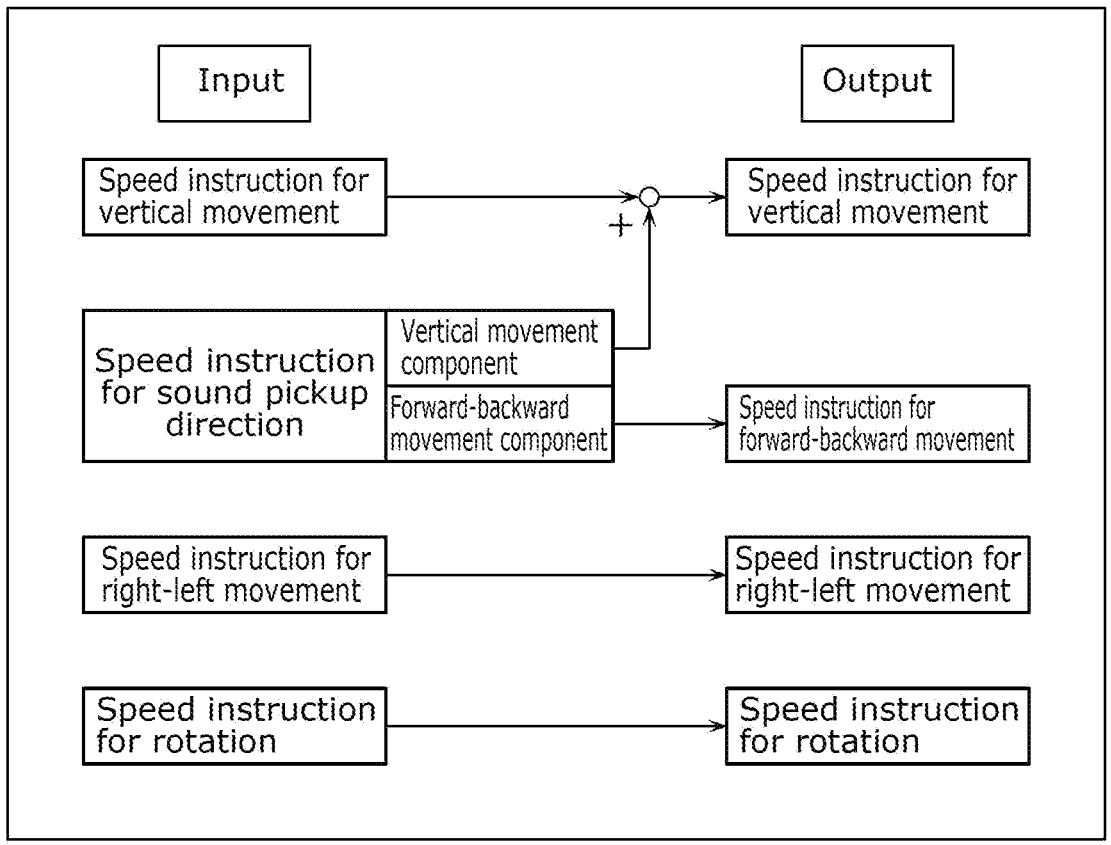
FIG. 5 illustrates a conversion operation performed by a direction converter when a sound pickup process is executed.
Figure 6:
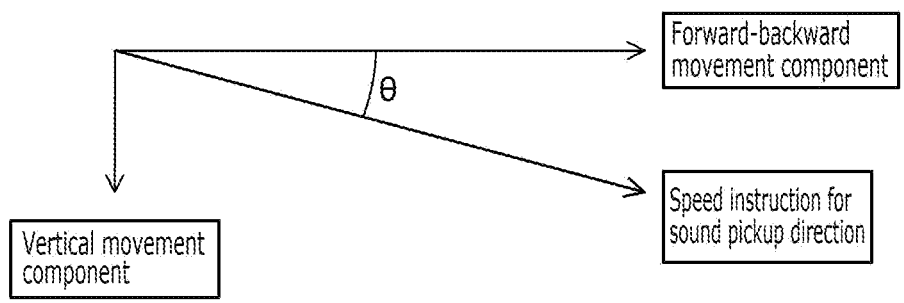
FIG. 6 illustrates a process performed to decompose an instruction for speed in the sound pickup direction, into a vertical movement component and a forward-backward movement component.

FIG. 5 illustrates a conversion operation performed by the direction converter when a sound pickup process is executed. FIG. 6 illustrates a process performed to decompose an instruction for speed in the sound pickup direction, into a vertical movement component and a forward-backward movement component.

In the sound pickup process, direction converter 202a obtains an operation signal from input IF 201. Then, direction converter 202a substitutes a speed instruction for a movement speed in the forward-backward direction that is included in the operation indicated by the user in the operation signal, by a speed instruction for a movement speed in sound pickup direction 153 of directional microphone 105. Then, direction converter 202a controls the movement of unmanned aircraft 100 based on a result of associating the movement direction of unmanned aircraft 100 with sound pickup direction 153 of directional microphone 105. For example, direction converter 202a may associate the movement direction of unmanned aircraft 100 with sound pickup direction 153 in accordance with an angular difference between the sound pickup direction of directional microphone 105 and the forward-backward direction (that is, the horizontal direction) of unmanned aircraft 100.

For example, direction converter 202a decomposes the substituted speed instruction for the movement speed in the sound pickup direction, into a movement speed component in the horizontal direction and a movement speed component in the vertical direction in accordance with an association in which the sound pickup direction is oriented downward by angle θ from the horizontal direction as illustrated in FIG. 6. As illustrated in FIG. 5, direction converter 202a generates the decomposed movement speed component in the horizontal direction as the speed instruction for the movement speed of unmanned aircraft 100 in the forward-backward direction. Then, direction converter 202a adds the decomposed movement speed component in the vertical direction to the movement speed in the vertical direction that is included in the operation indicated by the operation signal. Thus, direction converter 202a generates the movement speed obtained as a result of the addition, as the speed instruction for the movement speed in the vertical direction. Here, direction converter 202a performs the movement speed addition, where an upward-movement speed in the vertical direction is positive and a downward-movement speed in the vertical direction is negative. Moreover, direction converter 202a outputs a speed instruction for the movement speed in a right-left direction and a speed instruction for a rotational movement speed, without any change.

As described, direction converter 202a controls the movement of unmanned aircraft 100 by converting the inputted operation in accordance with the result of the association. Thus, in the sound pickup process, unmanned aircraft 100 can be moved easily in the sound pickup direction as the forward-backward direction. This enables the user to easily perform an operation to move unmanned aircraft 100 close to or away from the sound source.

In the above description, directional microphone 105 is fixed to face forward of unmanned aircraft 100 when unmanned aircraft 100 is viewed from above. On this account, direction converter 202a substitutes the speed instruction for the movement speed in the forward-backward direction by the speed instruction for the movement speed in sound pickup direction 153. However, this is not intended to be limiting.

For example, suppose that directional microphone 105 is fixed to face in a right-downward direction of unmanned aircraft 100 with respect to the forward direction of unmanned aircraft 100. In this case, direction converter 202a may substitute the speed instruction for the movement speed in the forward-backward direction, which is included in the operation of the user obtained from input IF 201, by the speed instruction for the movement speed in the sound pickup direction. In addition, direction converter 202a may substitute the speed instruction for the movement speed in the right-left direction by a speed instruction for a movement speed in a direction perpendicular to the sound pickup direction on a horizontal plane. In this case, the speed instruction for the movement speed in the forward-backward direction is decomposed into movement speed components in the forward-backward, vertical, and right-left directions of unmanned aircraft 100. Moreover, in this case, the speed instruction for the movement speed in the right-left direction is decomposed into movement speed components in the forward-backward and right-left directions. Then, the decomposed components for the movement speed in the vertical direction are combined into a speed instruction for the vertical direction. The decomposed components for the movement speed in the forward-backward direction are combined into a speed instruction for the forward-backward direction. The decomposed components for the movement speed in the right-left direction are combined into a speed instruction for the right-left direction.

The direction indicated by the speed instruction to be substituted by the speed instruction for the movement speed in sound pickup direction 153 may be determined according to the imaging direction of camera 103. For example, when the imaging direction of camera 103 is forward, the speed instruction for the forward-backward direction may be substituted by the speed instruction for sound pickup direction 153. When the imaging direction of camera 103 is on the right, the speed instruction for the right-left direction may be substituted by the speed instruction for sound pickup direction 153.

If unmanned aircraft 100 includes a plurality of directional microphones, a sound pickup direction by which the speed instruction for the movement speed in the forward-backward direction is substituted may be determined according to the imaging direction of camera 103. For example, if the imaging direction of camera 103 is forward, the speed instruction for the forward-backward direction may be substituted by the speed instruction for the sound pickup direction of a directional microphone disposed to face forward. If the imaging direction of camera 103 is on the right, the speed instruction may be substituted by the speed instruction for the sound pickup direction of a directional microphone disposed to face to the right.

When the sound pickup process is not performed, the operation signal outputted from input IF 201 is outputted, without conversion, to unmanned aircraft 100 via communication IF 205. Thus, when the sound pickup process is not performed, unmanned aircraft 100 is controlled to move in the specified direction at the specified movement speed according to the operation signal.

Image processor 202b obtains the distance image, the sound data, the position and the orientation of camera 103, and the position and the orientation of directional microphone 105, from memory 203. Image processor 202b calculates sound pickup direction 153 of directional microphone 105 using the position and the orientation of camera 103 and the position and the orientation of directional microphone 105.

Moreover, image processor 202b also obtains, from memory 203, the measured distance to the subject captured in the captured image using the obtained distance image. Image processor 202b further calculates sound pickup range 150 of directional microphone 105 at the position of the subject captured in the captured image, using sound pickup direction 153 calculated and the measured distance obtained.

Figure 7:
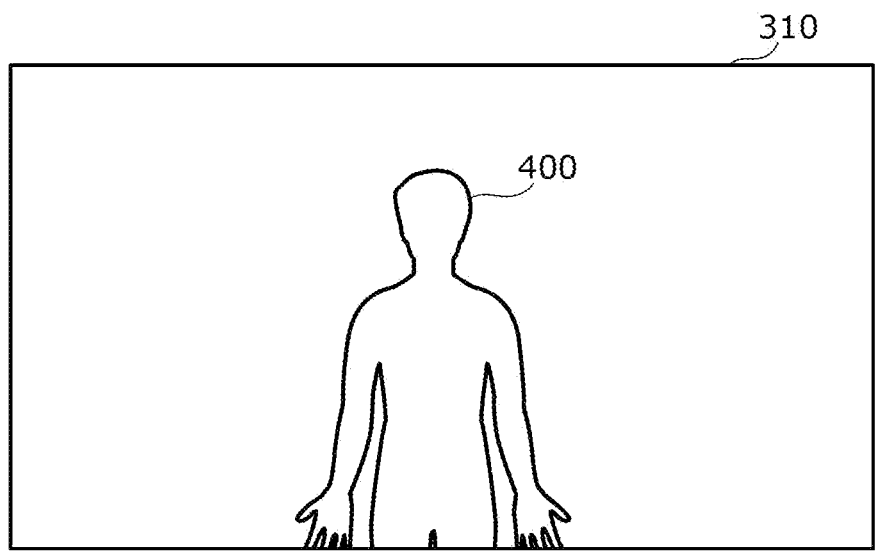
FIG. 7 illustrates an example of a captured image of a person as a sound source.
Figure 8:
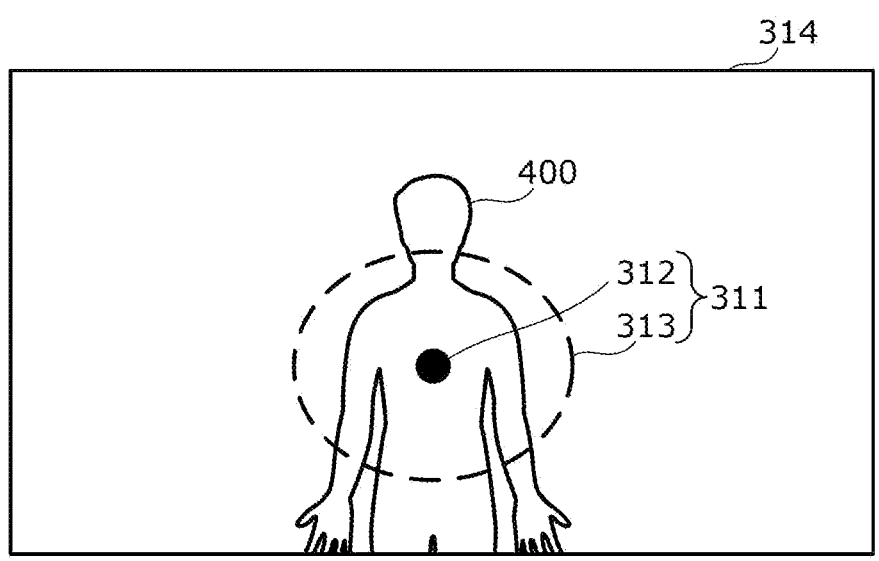
FIG. 8 illustrates an example of a captured image on which an object is superimposed.

Then, as illustrated in FIG. 7 and FIG. 8, image processor 202b superimposes object 311 including object 312 indicating sound pickup direction 153 and object 313 indicating sound pickup range 150, on captured image 310 of the distance image at the position corresponding to sound pickup direction 153 calculated. Here, object 312 indicates a base direction in which directional microphone 105 picks up sound. For example, image processor 202b calculates object 312 and object 313 in accordance with sound pickup range 150 and a distance to a subject captured in captured image 310. Image processor 202b reads the sound pickup range of directional microphone 105 from memory 203. By applying the read sound pickup range to a position having sound pickup direction 153 as an axis, image processor 202b determines sound pickup range 150 of directional microphone 105 on captured image 310. Image processor 202b uses the obtained distance image to calculate a distance to a nearest subject present in sound pickup range 150 determined, and calculates object 312 and object 313 corresponding to the calculated distance. In this case, image processor 202b divides the distance image into a plurality of areas and calculates a distance for each of the plurality of areas. Then, image processor 202b calculates, as object 312 and object 313, an object corresponding to a distance that satisfies a predetermined condition among a plurality of distances calculated for the plurality of areas in sound pickup range 150. Object 313 is oval, for example.

The distance that satisfied the predetermined condition among the plurality of distances may be the shortest distance or a distance calculated most often. Alternatively, this distance may be calculated based on the distance range in which a largest number of distances are distributed. Moreover, an object corresponding to a specific distance in sound pickup range 150 may be calculated based on sizes of imaging range 130 and sound pickup range 150 or a positional relationship between imaging range 130 and sound pickup range 150 at a position that is the specific distance away from unmanned aircraft 100. To be more specific, object 313 may be calculated based on the sizes of imaging range 130 and sound pickup range 150 or the positional relationship between imaging range 130 and sound pickup range 150 in a section plane roughly perpendicular to the imaging direction or sound pickup direction 153 at the position that is the specific distance away from unmanned aircraft 100.

The distance for each area may be a representative value, such as an average value or a median value, of a plurality of distances measured for a plurality of pixels in this target area. Alternatively, the distance may be the plurality of distances themselves measured for the plurality of pixels. If ranging sensor 104 includes a different sensor instead of a depth camera, ranging sensor 104 may divide imaging range 130 of camera 103 into a plurality of areas in a plane crossing an optical axis of camera 103 and calculate a distance to a subject for each of these divided areas. In this case, unmanned aircraft 100 transmits the captured image captured by camera 103 and a plurality of distances measured for the plurality of areas on the captured image.

Figure 14:
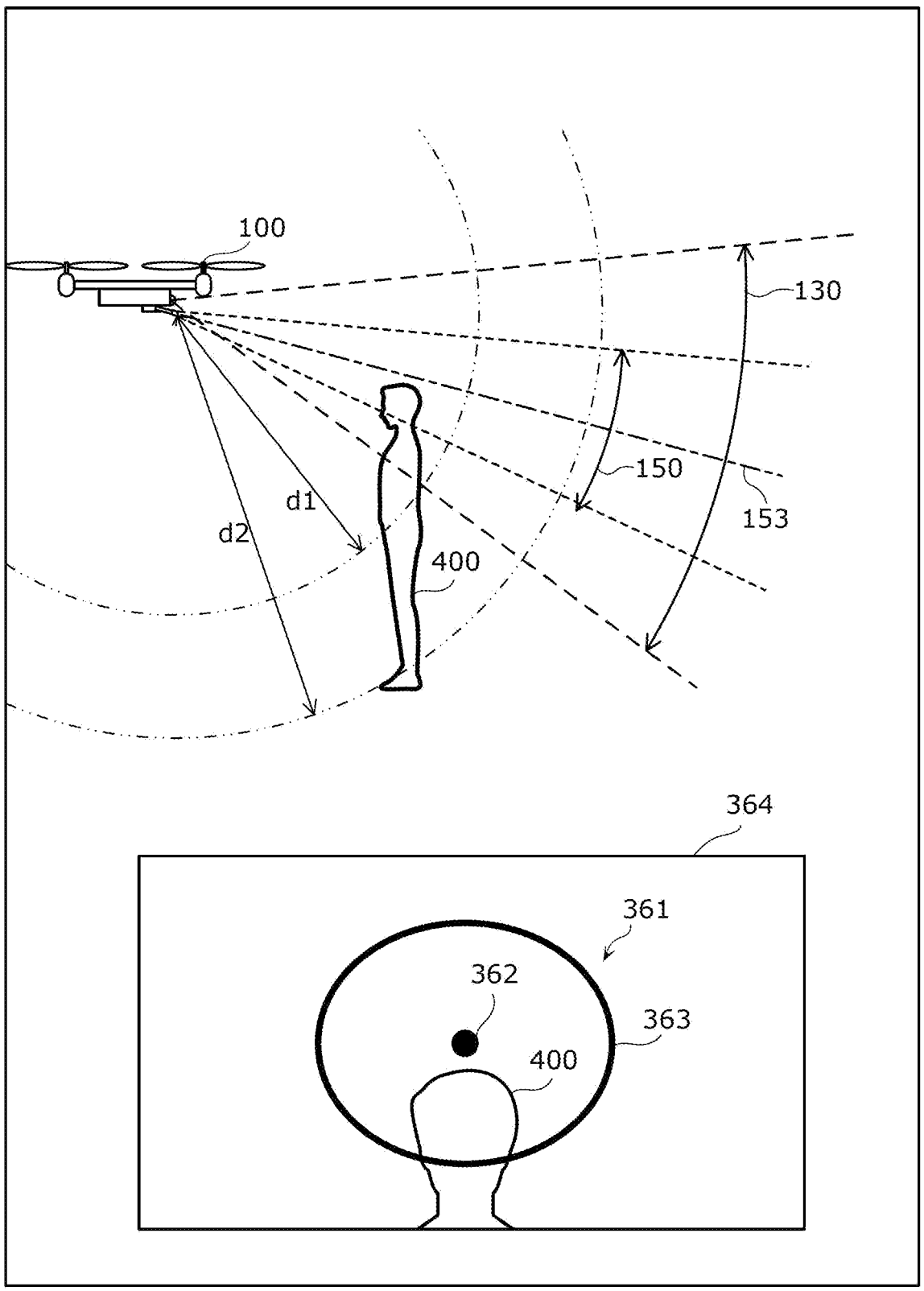
FIG. 14 illustrates a positional relationship between the unmanned aircraft and the sound source, as well as a superimposed image, in a sixth situation.

The method used by image processor 202b to calculate objects 312 and 313 is not intended to be limiting. For example, image processor 202b may first determine a position of object 312 on the image and then generate an object, as object 313, corresponding to the distance to the subject captured in the determined position. In this case, ranging sensor 104 may measure a distance to the subject in sound pickup direction 153. Object 313 is oval, for example. In this case, if sound source 400 is present in sound pickup range 150 but sound pickup direction 153 deviates from sound source 400, a distance from unmanned aircraft 100 to a subject farther away than sound source 400 is measured as illustrated in FIG. 14 described later.

Moreover, image processor 202b may determine for each pixel whether the pixel is within sound pickup range 150, using sound pickup range 150 associated with captured image 310 and distance information for each pixel in the distance image. Then, image processor 202b may calculate, as object 313, the area of the pixel present within (or on a boundary of) sound pickup range 150. Similarly, image processor 202b may determine for each pixel whether the pixel is in a position corresponding to sound pickup direction 153. Then, image processor 202b may calculate object 312 so that object 312 is displayed on the pixels present in sound pickup direction 153. In this case, object 313 calculated is unlikely to have a smooth curve because the distance is different for each pixel. However, the sound pickup range is displayed more accurately. If sound pickup range 150 extends over a plurality of subjects, object 313 may be displayed differently for each of the distances to the subjects.

In each of FIG. 7 and FIG. 8, the subject captured in captured image 310 is a person as an example of the sound source. FIG. 7 illustrates an example of the image capturing a person as the sound source. FIG. 8 illustrates an example of the captured image on which the object is superimposed.

In the present embodiment, it is assumed that the user operating the unmanned aircraft determines whether a subject captured in captured image 310 is a sound source and that the user orients the sound pickup direction toward the sound source determined as being a sound pickup target by the user. For this reason, presentation-manner control according to the present embodiment may be understandably performed on a subject that is not a sound source. Moreover, the unmanned aircraft may determine whether a subject captured in captured image 310 is a sound source. If the subject is determined as being the sound source, image processor 202b may perform the presentation-manner control and direction converter 202a may perform the direction conversion process according to the present embodiment. For example, image processor 202b recognizes a subject captured in captured image 310 through image analysis of captured image 310 and determines whether the recognized subject is a sound source. If the recognized subject is determined as being the sound source, image processor 202b performs the presentation-manner control and direction converter 202a performs the direction conversion process for the operation.

When display 204 of controller 200 is activated or when an instruction for superimposition of an object is received from the user, image processor 202b may perform the presentation-manner control and direction converter 202a may perform the direction conversion process according to the present embodiment. Moreover, unmanned aircraft 100 determines whether a distance between a subject, which is a sound source, and unmanned aircraft 100 is a predetermined distance or less. If the distance is determined as being the predetermined distance or less, image processor 202b may perform the presentation-manner control and direction converter 202a may perform the direction conversion process according to the present embodiment.

Image processor 202b outputs captured image 314 on which object 311 is superimposed (hereinafter, the image as a result of the superimposition is referred to as the superimposed image) to display 204. Thus, display 204 displays superimposed image 314.

Next, an example of the superimposed image generated by image processor 202b is described for each situation, with reference to FIG. 9 to FIG. 16.

Figure 9:
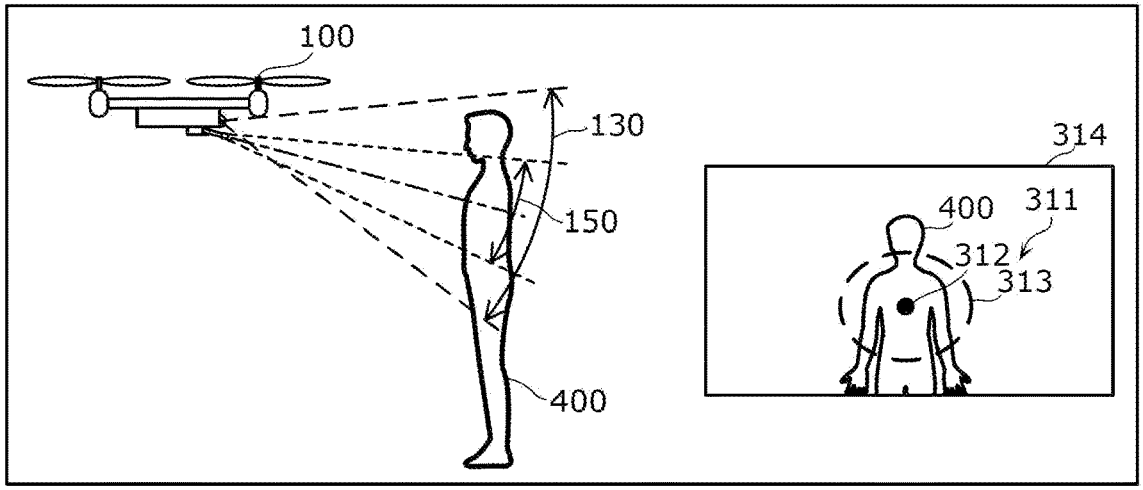
FIG. 9 illustrates a positional relationship between the unmanned aircraft and the sound source, as well as a superimposed image, in a first situation.
Figure 10:
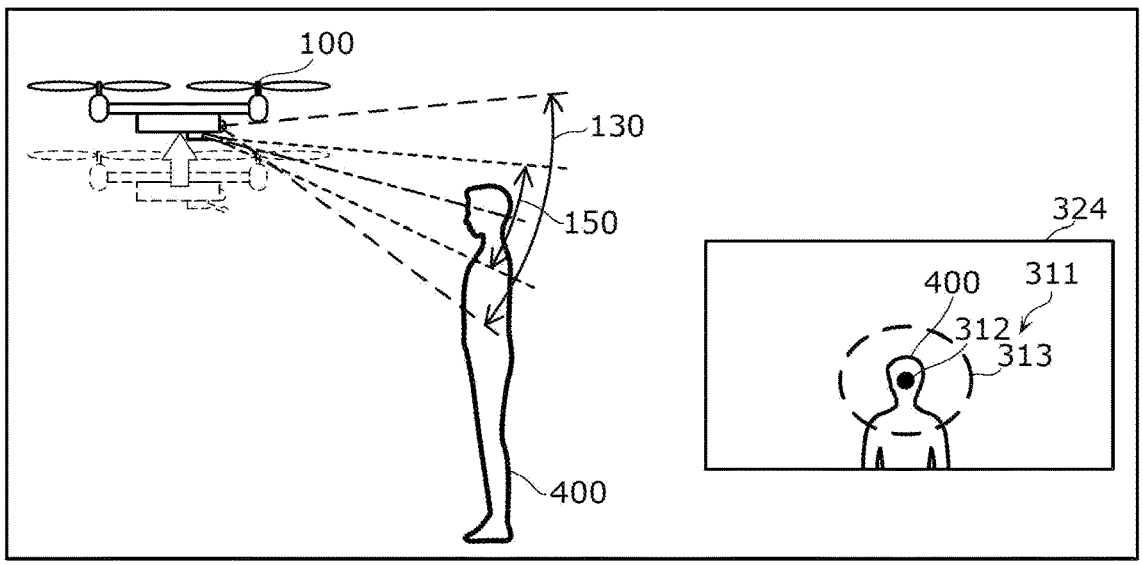
FIG. 10 illustrates a positional relationship between the unmanned aircraft and the sound source, as well as a superimposed image in a second situation.
Figure 11:
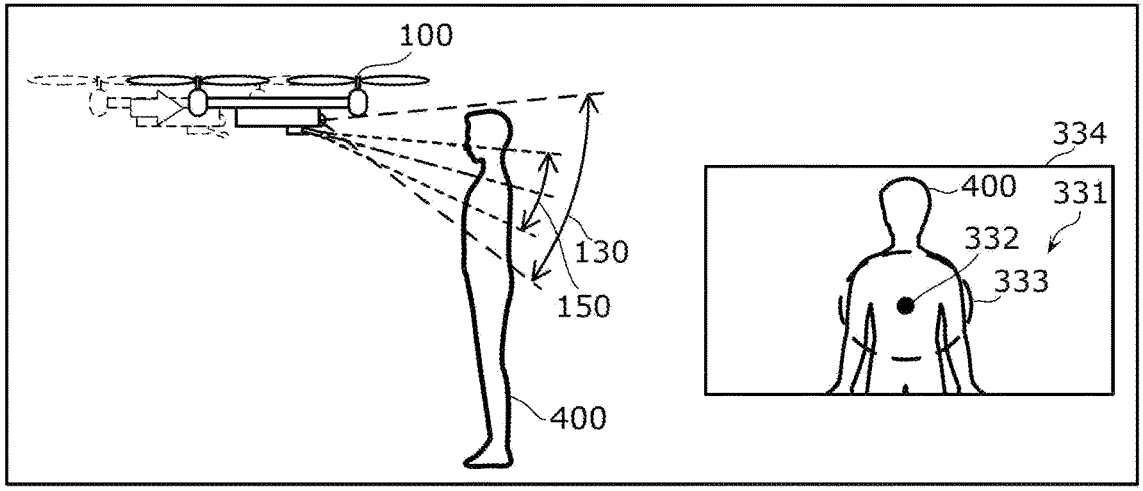
FIG. 11 illustrates a positional relationship between the unmanned aircraft and the sound source, as well as a superimposed image in a third situation.
Figure 12:
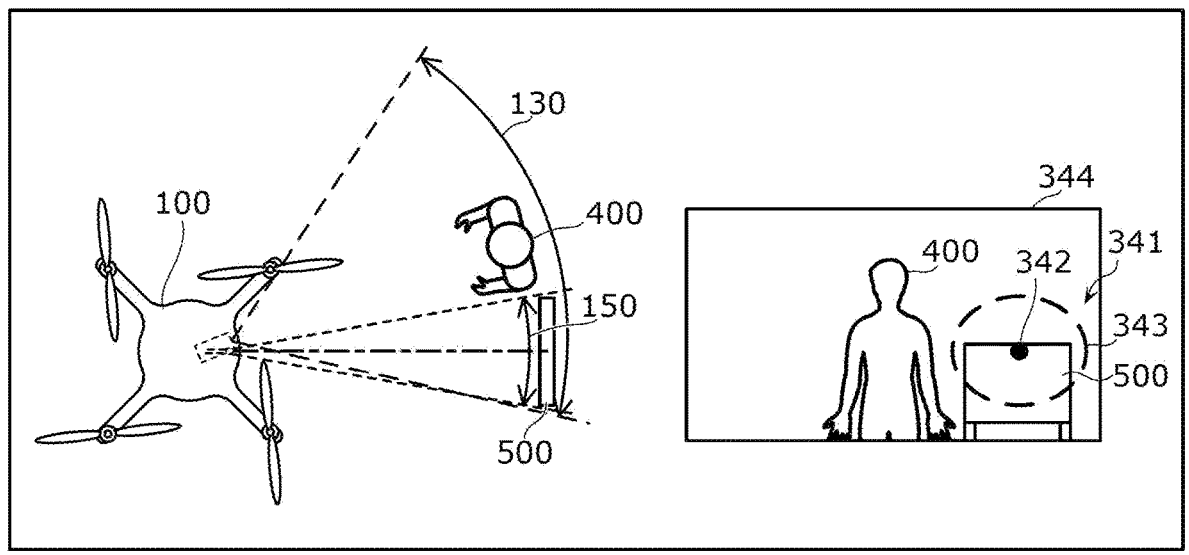
FIG. 12 illustrates a positional relationship between the unmanned aircraft and the sound source, as well as a superimposed image, in a fourth situation.
Figure 13:
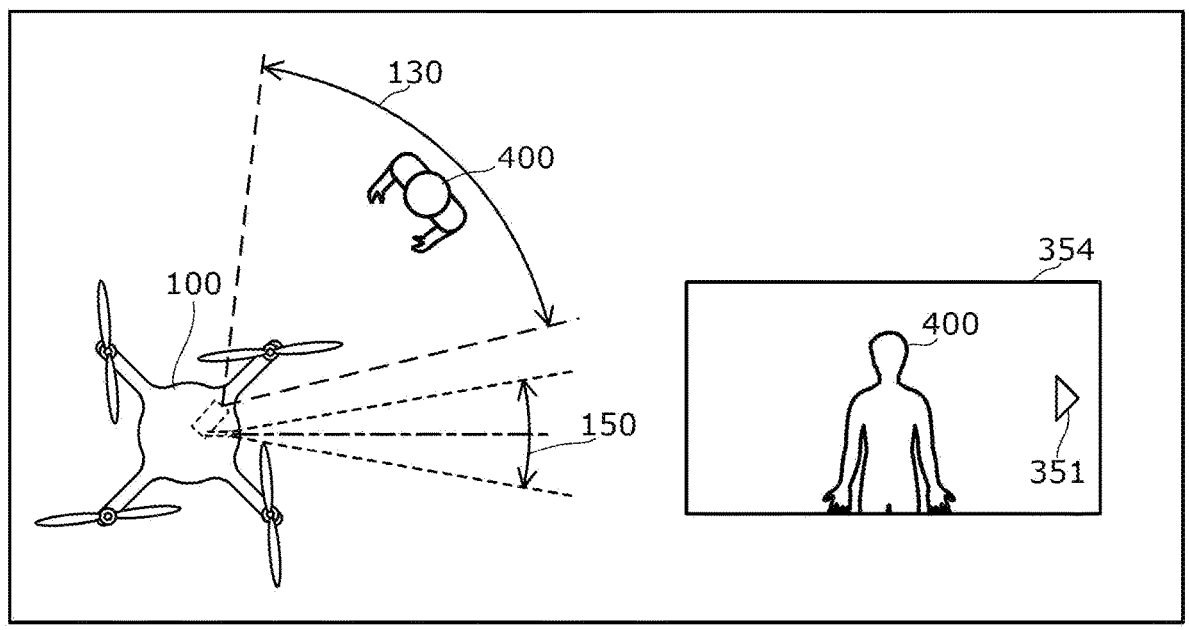
FIG. 13 illustrates a positional relationship between the unmanned aircraft and the sound source, as well as a superimposed image, in a fifth situation.
Figure 15:
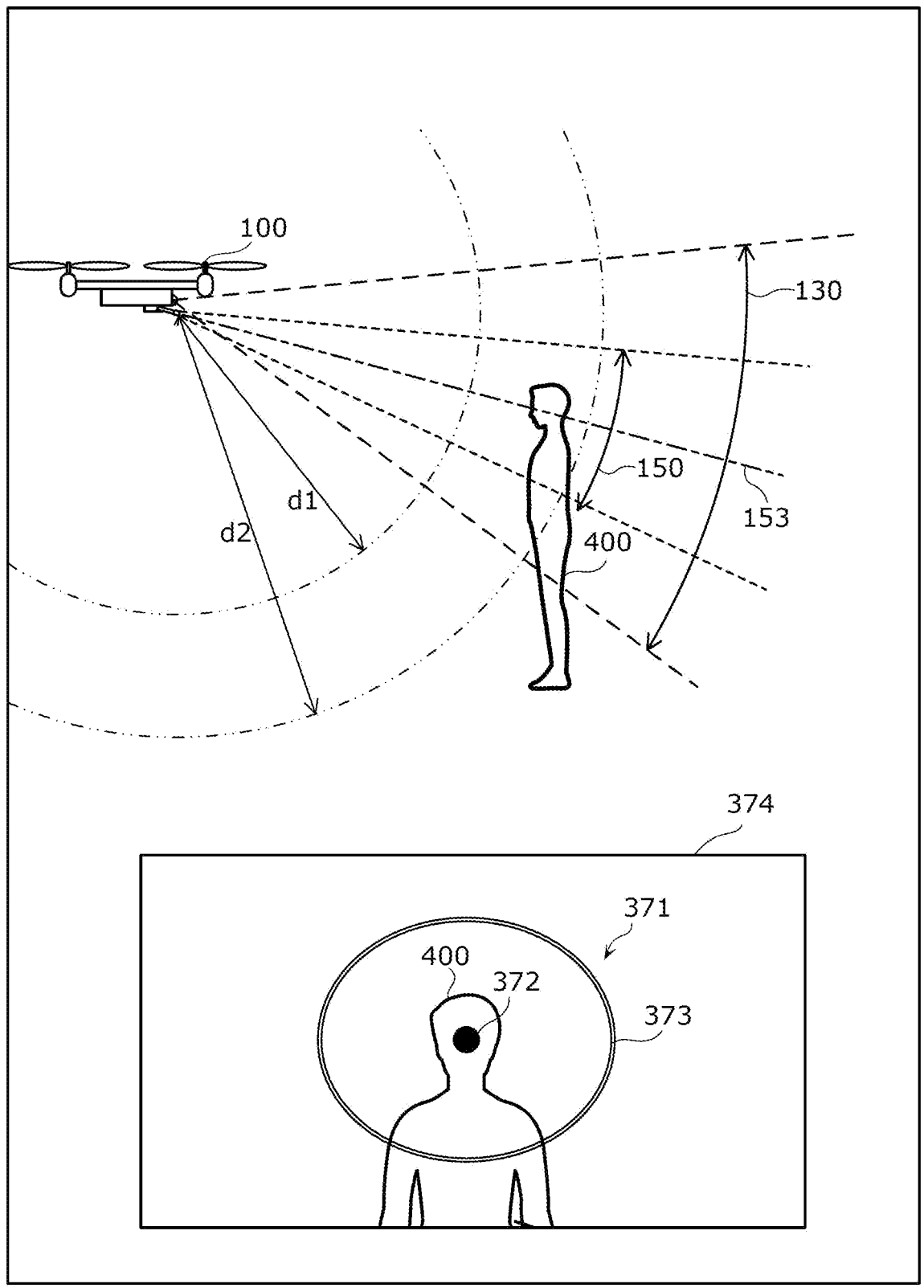
FIG. 15 illustrates a positional relationship between the unmanned aircraft and the sound source, as well as a superimposed image, in a seventh situation.
Figure 16:
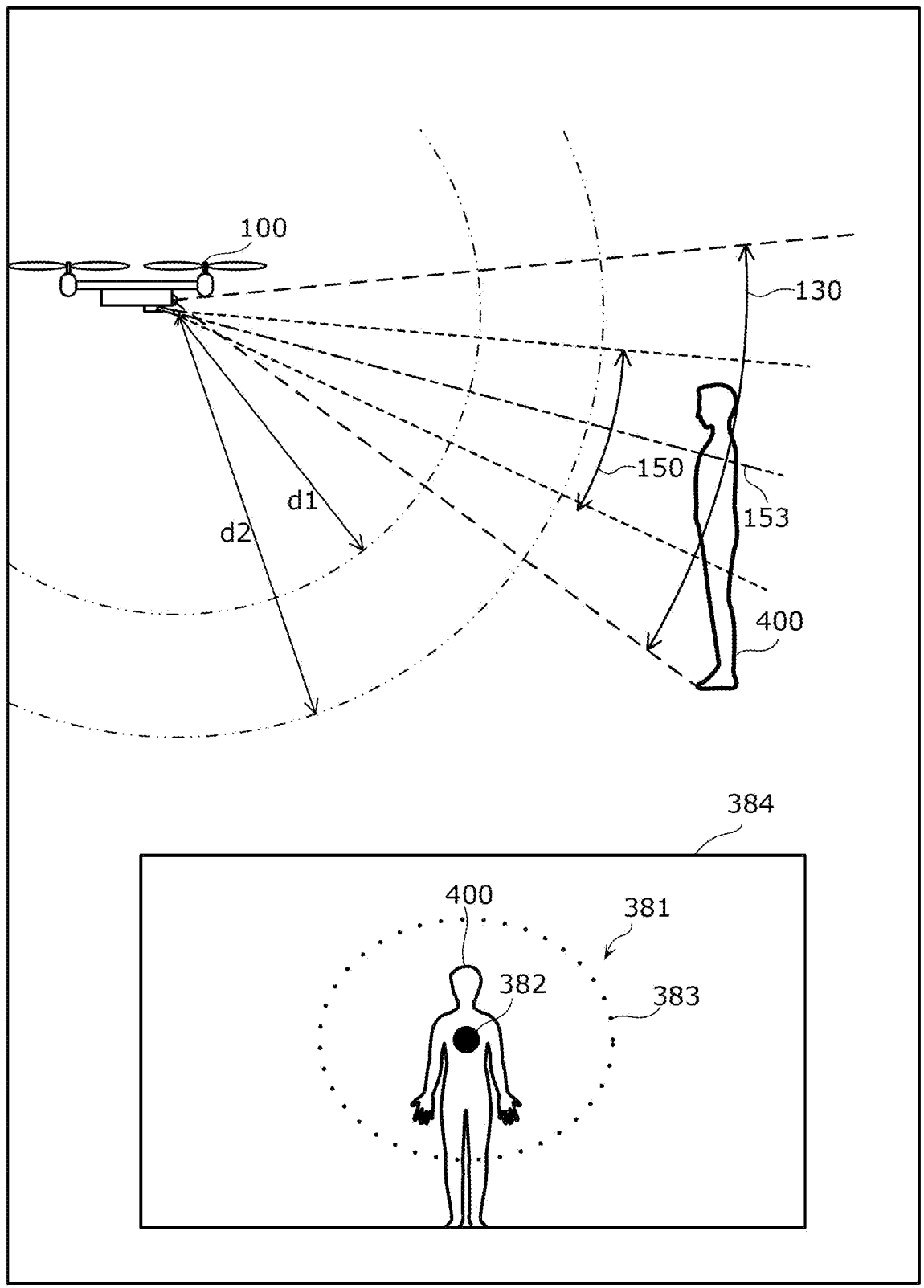
FIG. 16 illustrates a positional relationship between the unmanned aircraft and the sound source, as well as a superimposed image, in an eighth situation.

FIG. 9 illustrates a positional relationship between the unmanned aircraft and the sound source, as well as a superimposed image, in a first situation. FIG. 10 illustrates a positional relationship between the unmanned aircraft and the sound source, as well as a superimposed image in a second situation. FIG. 11 illustrates a positional relationship between the unmanned aircraft and the sound source, as well as a superimposed image in a third situation. FIG. 12 illustrates a positional relationship between the unmanned aircraft and the sound source, as well as a superimposed image, in a fourth situation. FIG. 13 illustrates a positional relationship between the unmanned aircraft and the sound source, as well as a superimposed image, in a fifth situation. FIG. 14 illustrates a positional relationship between the unmanned aircraft and the sound source, as well as a superimposed image, in a sixth situation. FIG. 15 illustrates a positional relationship between the unmanned aircraft and the sound source, as well as a superimposed image, in a seventh situation. FIG. 16 illustrates a positional relationship between the unmanned aircraft and the sound source, as well as a superimposed image, in an eighth situation. FIG. 9 to FIG. 11 and FIG. 14 to FIG. 16 are side views of the unmanned aircraft. FIG. 12 and FIG. 13 are top views of the unmanned aircraft.

The first situation is similar to the situations illustrated in FIG. 3 and FIG. 8. Thus, description of this situation is omitted here.

In the second situation, unmanned aircraft 100 has ascended from the position in the first situation. In the second situation as illustrated in FIG. 10, imaging range 130 and sound pickup range 150 move over sound source 400 as a result of the ascent of unmanned aircraft 100. On this account, sound source 400 captured is located lower in superimposed image 324 as compared to sound source 400 in superimposed image 314 in the first situation. Unmanned aircraft 100 does not move in the horizontal nor forward-backward direction, and thus object 311 is superimposed in superimposed image 324 without any change from the first situation.

In the third situation, unmanned aircraft 100 has moved from the position in the first situation to approach sound source 400 in the horizontal direction, or more specifically, unmanned aircraft 100 has moved forward. In the third situation as illustrated in FIG. 11, imaging range 130 and sound pickup range 150 change with respect to sound source 400 as a result of the forward movement of unmanned aircraft 100. On this account, sound source 400 captured is larger in superimposed image 334 as compared to sound source 400 in superimposed image 314 in the first situation. Moreover, object 333 indicating sound pickup range 150 in object 331 is calculated to increase in size with the size increase of sound source 400. At the same time, an area of sound pickup range 150 on sound source 400 decreases with decreasing distance to sound source 400. As a result, object 313 on superimposed image 314 and object 333 on superimposed image 334 are not so different in size. Here, object 332 indicating sound pickup direction 153 does not change in orientation with respect to camera 103 and thus points to the same position as object 312.

The fourth situation is an example in which camera 103 is rotatably connected to airframe 120 and captures an image in a left angular range instead of the forward range of unmanned aircraft 100. In the fourth situation illustrated in FIG. 12, sound pickup range 150 is included in imaging range 130 and sound source 400 is outside sound pickup range 150. Thus, object 341 including object 342 indicating sound pickup direction 153 and object 343 indicating sound pickup range 150 is superimposed at a position where object 341 is not overlaid on sound source 400 captured in superimposed image 344. This allows the user to easily orient sound pickup range 150 of directional microphone 105 toward sound source 400 without changing the imaging range of camera 103 by performing an operation on controller 200 to move unmanned aircraft 100 in a counter-clockwise direction or to the left.

The fifth situation is an example in which camera 103 is rotatably connected to airframe 120 as in the fourth situation and captures an image in a more left angular range as compared to the fourth situation. In the fifth situation as illustrated in FIG. 13, sound pickup range 150 is shifted to the right from imaging range 130. On this account, image processor 202b generates superimposed image 354 in which object 351 pointing toward sound pickup direction 153 from imaging range 130 is superimposed. Object 351 is a triangle pointing to the right, for example. To be more specific, object 351 indicates that sound pickup range 150 of directional microphone 105 is on the right. Object 351 may be a rightward arrow. Object 351 is superimposed in a region near a side that is closer to the indicated direction on the captured image. As in the fourth situation, this allows the user to easily orient sound pickup range 150 of directional microphone 105 toward sound source 400 without changing the imaging range of camera 103 by performing the operation on controller 200 to move unmanned aircraft 100 in the counterclockwise direction or to the left. Here, object 351 indicates a direction in which sound pickup direction 153 of directional microphone 105 is closer.

In examples described in sixth to eighth situations, the presentation-manner control is performed for an object according to a distance from unmanned aircraft 100 to sound source 400 when sound source 400 is in sound pickup range 150 of directional microphone 105.

In the sixth situation as illustrated in FIG. 14, sound source 400 is in sound pickup range 150 of directional microphone 105 and also in a first range of first distance d1 in which the sound pickup quality of directional microphone 105 is highest, that is, a first quality. Here, the first range has first distance d1 measured from the position of directional microphone 105 as the starting point, for example. Thus, image processor 202b generates superimposed image 364 in which object 361 is presented with the first quality, according to a difference between first distance d1 and a measured distance from unmanned aircraft 100 to sound source 400. For example, image processor 202b uses a thick line to present object 363, which indicates the sound pickup range in object 361.

In the seventh situation as illustrated in FIG. 15, sound source 400 is in sound pickup range 150 of directional microphone 105 and also in a second range of second distance d2 in which the sound pickup quality of directional microphone 105 is second highest, that is, a second quality. Here, the second range is, for example, a range between the position having first distance d1 measured from the starting point and the position having second distance d2 measured from the starting point when the starting point is the position of directional microphone 105. Thus, image processor 202b generates superimposed image 374 in which object 371 is presented with the second quality, according to a difference between second distance d2 and a measured distance from unmanned aircraft 100 to sound source 400. For example, image processor 202b uses a double line to present object 373, which indicates the sound pickup range in object 371.

In the eighth situation as illustrated in FIG. 16, sound source 400 is in sound pickup range 150 of directional microphone 105 and also in a third range, farther than second distance d2, in which the sound pickup quality of directional microphone 105 is low, that is, a third quality. Here, the third range is farther than the second range of second distance d2 measured from the position of directional microphone 105 as the starting point, for example. Thus, image processor 202b generates superimposed image 384 in which object 381 is presented with the third quality, according to a difference between second distance d2 and a measured distance from unmanned aircraft 100 to sound source 400. For example, image processor 202b uses a broken line to present object 383, which indicates the sound pickup range in object 381.

If the difference is greater than or equal to a threshold value, image processor 202b may maintain the presentation manner of the object without any change. Moreover, the presentation manner of the object may be maintained based on, instead of the sound pickup quality, whether any subject is present in a range where the measured distance is measurable. For example, if directional microphone 105 and camera 103 are assumed to be sufficiently close to each other, positions and sizes of objects 382 and 383 on the image do not significantly change with respect to a distance to the subject of object 382. Thus, when the subject is outside the range of the ranging sensor, image processor 202b calculates and displays the positions and sizes of objects 382 and 383 on the assumption that the subject is at a maximum measurable distance of the ranging sensor.

In the fourth situation, image processor 202b may perform the presentation-manner control for the object according to the distance from unmanned aircraft 100 to sound source 400 as in the sixth to eighth situations described above. Subject 500 other than sound source 400 is in sound pickup range 150 in the fourth situation. For example, subject 500 is a signboard.

In this case, even if subject 500 in sound pickup range 150 of directional microphone 105 is detected from the measured distance of ranging sensor 104, image processor 202b does not change the presentation manner of object 343. More specifically, if subject 500 present outside sound pickup range 150 enters sound pickup range 150, image processor 202b superimposes object 343 on the captured image without changing the presentation manner used before subject 500 enters sound pickup range 150. Thus, even if the distance from unmanned aircraft 100 to subject 500 in sound pickup range 150 is within the third range farther than the range of second distance d2, image processor 202b does not change the presentation manner to the manner used when sound source 400 is in the third range. Here, whether the subject is a sound source is determined through image analysis of the captured image for example, as described above.

If sound source 400 is not in sound pickup range 150, image processor 202b may maintain an initial presentation manner to present object 343. Thus, in the fourth situation, image processor 202b superimposes object 343 on the captured image in the initial presentation manner.

As described above, image processor 202b changes the presentation manner according to the sound pickup quality by changing the line styles in the sixth to eight situations. Instead of changing the line style of an object indicating the sound pickup range, image processor 202b may change the presentation manner by changing a color of the object or by changing density of the color of the object. Alternatively, instead of changing the presentation manner of the object indicating the sound pickup range, image processor 202b may change the presentation manner of the object indicating the sound pickup direction. For example, image processor 202b may change the object indicating the sound pickup direction in size, or may cause the object to blink and then change a blinking rate.

Moreover, if sound source 400 is located closer than a position at a predetermined distance or a position within a safe range, image processor 202b may generate a superimposed image on which a warning sign has been superimposed and then display the generated superimposed image on display 204.

In the above embodiment, the object indicating the sound pickup range is presented by the line. However, this is not intended to be limiting. Different shades of color may be used to distinguish between inside and outside of the sound pickup range on the image.

[2. Operation]

The following describes an operation performed by unmanned aircraft 100 and controller 200 according to the embodiment. An example of an operation performed in the sound pickup process is first described.

Figure 17:
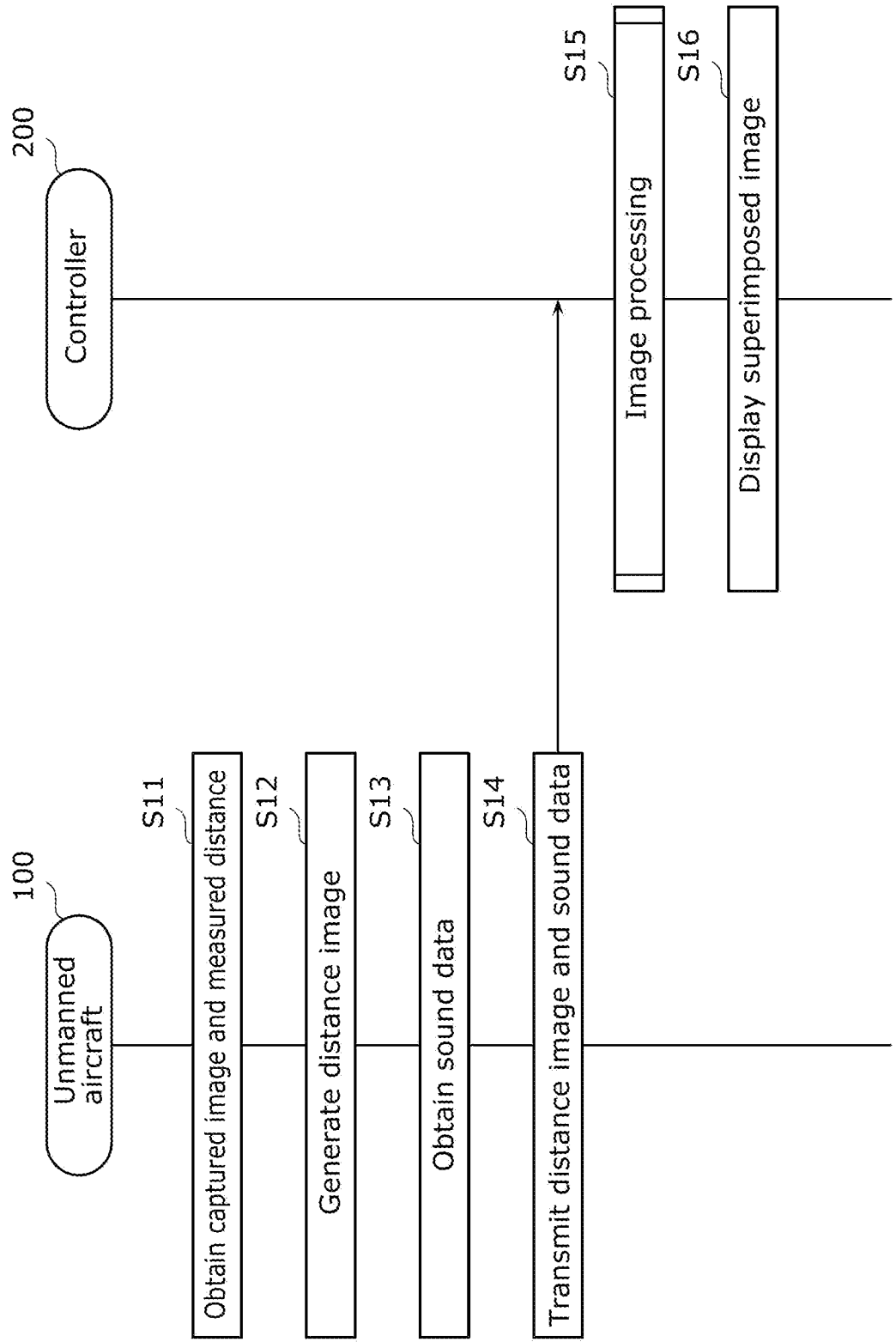
FIG. 17 is a sequence illustrating an example of an operation performed by the unmanned aircraft and the controller in the sound pickup process according to the embodiment.

FIG. 17 is a sequence illustrating the example of the operation performed by the unmanned aircraft and the controller in the sound pickup process according to the embodiment.

Image obtainer 101b of unmanned aircraft 100 obtains a captured image from camera 103 and obtains a measured distance from ranging sensor 104 (S11).

Next, image obtainer 101b generates a distance image using the captured image obtained and the measured distance obtained (S12). The processes in steps S11 and S12 are described in detail in the above description on the function of image obtainer 101b and thus omitted here.

Sound picker 101c obtains sound data sequentially generated by directional microphone 105 (S13). The process in step S13 is described in detail in the above description on the function of sound picker 101c and thus omitted here.

Processor 101 transmits the distance image generated and the sound data generated, to controller 200 via communication IF 107 (S14). Here, processor 101 may transmit, to controller 200 via communication IF 107, the information stored in memory 106 to indicate the position and orientation of camera 103 and the information stored in memory 106 to indicate the position, orientation, and sound pickup direction of directional microphone 105.

Next, receiving the distance image and the sound data, controller 200 executes the image processing (S15). The image processing is described in detail with reference to FIG. 18.

Figure 18:
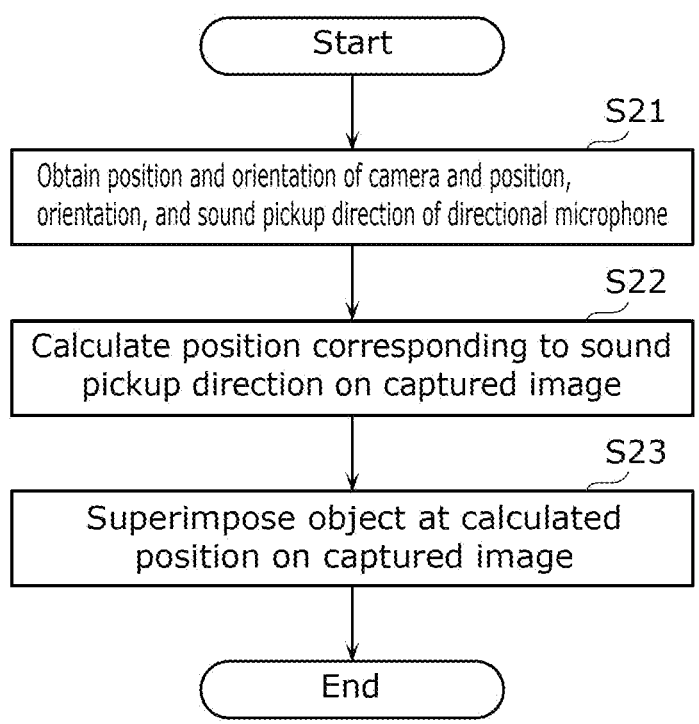
FIG. 18 is a flowchart illustrating details of image processing performed by the controller according to the embodiment.

FIG. 18 is a flowchart illustrating details of the image processing performed by the controller according to the embodiment.

Image processor 202b of controller 200 obtains the information indicating the position and orientation of camera 103 and the information indicating the position, orientation, and sound pickup direction of directional microphone 105 (S21). Image processor 202b may obtain the aforementioned information from unmanned aircraft 100 via communication IF 107. Alternatively, if the aforementioned information is previously stored in memory 203, image result 202b may obtain the aforementioned information from memory 203.

Based on the obtained information indicating the position and orientation of camera 103 and the position, orientation, and sound pickup direction of directional microphone 105, image processor 202b calculates a position corresponding to the sound pickup direction on the captured image in the obtained distance image (S22).

Image processor 202b superimposes an object indicating the sound pickup direction, at the position corresponding to the calculated sound pickup direction on the captured image (S23). The processes in steps S21 and S23 are described in detail in the above description on the function of image processor 202b and thus omitted here.

Referring back to FIG. 17, processor 202 displays the superimposed image generated in the image processing on display 204 (S16).

Next, the operation conversion process performed in the sound pickup process is described.

FIG. 19 is a sequence illustrating an example of an operation performed by the unmanned aircraft and the controller in the operation conversion process of the unmanned aircraft according to the embodiment.

Direction converter 202a of controller 200 obtains the sound pickup direction of directional microphone 105 of unmanned aircraft 100 (S31). Direction converter 202a may obtain the aforementioned sound pickup direction from unmanned aircraft 100 via communication IF 107. Alternatively, if the aforementioned sound pickup direction is previously stored in memory 203, direction converter 202a may obtain the aforementioned sound pickup direction from memory 203.

Direction converter 202a receives, from input IF 201, an operation in which the obtained sound pickup direction is the forward-backward direction (S32).

Direction converter 202a converts the operation into an operation signal instructing unmanned aircraft 100 to move in the corresponding direction (S33). Then, direction converter 202a outputs the converted operation signal to unmanned aircraft 100 via communication IF 206 (S34). The processes in steps S31 and S33 are described in detail in the above description on the function of direction converter 202a and thus omitted here.

Unmanned aircraft 100 performs the flight control according to the operation signal received (S35).

[3. Advantageous Effects Etc.]

Controller 200 according to the present embodiment causes display 204 to display superimposed image 314 on which object 311 indicating sound pickup direction 153 of directional microphone 105 is superimposed at the position corresponding to calculated sound pickup direction 153 on the captured image outputted from camera 103 of unmanned aircraft 100. As a result, the user is able to find the position of sound pickup direction 153 of directional microphone 105 on superimposed image 314. More specifically, sound pickup direction 153 of directional microphone 105 can be visualized. Thus, while viewing superimposed image 314 displayed, the user is able to easily orient sound pickup direction 153 of directional microphone 105 toward sound source 400 by operating unmanned aircraft 100 to align object 311 with the sound source of the target sound. This enhances the quality of sound picked up using unmanned aircraft 100 operated by a person.

Image processor 202b of controller 200 according to the present embodiment further obtains a measured distance measured to a subject captured in the captured image, further calculates sound pickup range 150 of directional microphone 105 at a position of the subject using the sound pickup direction calculated and the measured distance obtained, and superimposes object 313 indicating calculated sound pickup range 150 on the captured image.

Direction converter 202a of controller 200 according to the present embodiment establishes an association between a movement direction of unmanned aircraft 100 and sound pickup direction 153, and controls movement of unmanned aircraft 100 based on a result of the association. Thus, the movement of unmanned aircraft 100 is controlled in a direction with respect to the sound pickup direction. This enables unmanned aircraft 100 to move while keeping sound pickup direction 153 of directional microphone 105 toward sound source 400.

Direction converter 202a of controller 200 according to the present embodiment receives an operation input relating to the movement of unmanned aircraft 100, and controls the movement of unmanned aircraft 100 by converting the operation input based on the result of the association. Thus, the user is able to easily move unmanned aircraft 100 in a direction with respect to the sound pickup direction. This enables the user to move unmanned aircraft 100 while keeping sound pickup direction 153 of directional microphone 105 toward sound source 400.

When sound pickup direction 153 calculated is outside imaging range 130 of camera 103, image processor 202b of controller 200 according to the present embodiment superimposes, on the captured image, object 351 pointing toward sound pickup direction 153 from imaging range 130. Thus, while viewing superimposed image 314 displayed, the user is able to easily orient sound pickup direction 153 of directional microphone 105 toward sound source 400 by operating unmanned aircraft 100 so that unmanned aircraft 100 is oriented in the direction indicated by object 351. This enhances the quality of sound pickup.

Image processor 202b of controller 200 according to the present embodiment further obtains a setting distance corresponding to quality of sound pickup of directional microphone 105, and controls a presentation manner of the object based on a difference between the measured distance obtained to the subject in the captured image and the setting distance obtained. Thus, the object can be displayed in the presentation manner that is different depending on whether the quality of sound pickup is assumed to be high or low according to the distance from the subject, which is sound source 400, to directional microphone 105. Thus, while viewing the superimposed image displayed, the user is able to operate unmanned aircraft 100 so that the object is displayed in the presentation manner with the high quality. This enhances the quality of sound pickup for the target sound obtained from directional microphone 105.

Image processor 202b of controller 200 according to the present embodiment maintains the presentation manner of the object when the difference is greater than or equal to a threshold value. If the quality of sound pickup is a predetermined quality or lower, the presentation manner of the object is maintained. This can reduce a processing load of changing the presentation manner.

[4. Variations]

Controller 200 according to the above embodiment may selectively display or not display an object indicating the sound pickup direction or the sound pickup range of directional microphone 105, according to an operation received from the user.

In the sound pickup process, controller 200 according to the above embodiment controls the movement of unmanned aircraft 100 by converting the inputted operation based on the result of the association so that unmanned aircraft 100 moves in the sound pickup direction of directional microphone 105. However, this is not intended to be limiting. Controller 200 may be allowed to disable the aforementioned conversion so that normal movement control is performed on unmanned aircraft 100 even if unmanned aircraft 100 is operated during the sound pickup process.

The above embodiment describes an example in which the object that is an oval frame is superimposed. However, this is not intended to be limiting. Instead of the oval frame, the object may be a filled oval or an oval with the outside filled.

If directional microphone 105 is a microphone array including a plurality of microphone elements, image processor 202b of controller 200 according to the above embodiment may generate a superimposed image on which the position of the sound source on the captured image that is determined based on the result outputted from the microphone array is superimposed. Then, the superimposed image generated may be displayed on display 204.

Controller 200 according to the above embodiment may recognize a shape of a person captured in the captured image through image recognition, and locate a mouth in the recognized shape of the person. Then, controller 200 may generate a superimposed image in which an object indicating the sound source is superimposed at a position of the located mouth of the person. Moreover, the superimposed image generated may be displayed on display 204.

Unmanned aircraft 100 according to the above embodiment includes four generators 110. The number of generators included in unmanned aircraft 100 is not limited to four. The number of generators may be one to three, or at least five.

Unmanned aircraft 100 according to the above embodiment includes airframe 120 that is connected to four generators 110 via four arms 121. However, this is not intended to be limiting. Four arms 121 may not be included if four generators 110 are connected to airframe 120. To be more specific, unmanned aircraft 100 may include four generators 110 directly connected to airframe 120.

Unmanned aircraft 100 according to the above embodiment includes one directional microphone 105. However, the number of directional microphones included in unmanned aircraft 100 is not limited to one and may be two or more. If the unmanned aircraft includes two or more directional microphones, the process of calculating the sound pickup direction of a directional microphone may be similarly performed for each of the two or more directional microphones. If the unmanned aircraft includes the two or more directional microphones in this way, an object indicating the sound pickup direction may be displayed for each of the directional microphones. This object may be displayed together with an identifier indicating the sound pickup direction of which one of the two or more directional microphones.

In the above embodiment, controller 200 includes image processor 202b. However, this is not intended to be limiting. Unmanned aircraft 100 may have the same function as image processor 202b. More specifically, unmanned aircraft 100 may generate a superimposed image and transmit the superimposed image generated to controller 200. In this case, controller 200 displays the superimposed image received from unmanned aircraft 100 on display 204.

Each of the components in the above embodiment may be configured with dedicated hardware or may be implemented by executing a software program suitable for the component. Each of the components may be implemented by a program executer, such as a CPU or a processor, reading and executing a software program recorded on a hard disk or a recording medium, such as a semiconductor memory. Here, software that implements, for example, controller 200 and the information processing method according to the above embodiment is the following program.

More specifically, this program is an information processing method executed by at least one information processing device including a processor and a memory. The information processing method includes: storing, into the memory, a captured image outputted from a camera included in an unmanned aircraft and a sound outputted from a directional microphone included in the unmanned aircraft; storing, into the memory, a position and an orientation of the camera and a position and an orientation of the directional microphone; obtaining, from the memory, the captured image, the sound, the position and the orientation of the camera, and the position and the orientation of the directional microphone; calculating a sound pickup direction of the directional microphone using the position and the orientation of the camera and the position and the orientation of the directional microphone; superimposing an object indicating the sound pickup direction at a position, on the captured image, corresponding to the sound pickup direction calculated; and causing a display device to display the captured image on which the object is superimposed.

Although the information processing device, the information processing method, and the program in an aspect or aspects according to the present disclosure have been described by way of the above embodiment, it should be obvious that the present disclosure is not limited to the above embodiment. Other embodiments implemented through various changes and modifications conceived by a person of ordinary skill in the art or through a combination of the structural elements in different embodiments described above may be included in the scope in an aspect or aspects according to the present disclosure, unless such changes, modifications, and combination depart from the scope of the present disclosure.

For example, the sound pickup range of the directional microphone may be variable. If the directivity of the microphone is changed, the sound pickup range based on the changed directivity is obtained, for example. In this case, an object based on the obtained sound pickup range is superimposed.

Note that machine learning may be used in the processing performed by processor 101 or processor 202. Types of machine learning algorithms include, for example: supervised learning algorithms that learn a relationship between an input and an output using training data given a label (output information) associated with input information; unsupervised learning algorithms that find a data structure from only unlabeled inputs; semi-supervised learning that approaches both labeled training data and unlabeled training data; and reinforcement learning algorithms that learn a set of actions leading to the highest reward by receiving feedback (reward) from an action chosen as a result of state observation. Specific approaches of machine learning include: a neural network (including deep learning using a multi-layered neural network); genetic programming; decision tree; Bayesian network; and support vector machine (SVM). Any one of the aforementioned specific examples may be used in the present disclosure.

INDUSTRIAL APPLICABILITY

The present disclosure is useful as an information processing device, an information processing method, and a recording medium that are capable of enhancing the quality of sound picked up using an unmanned aircraft operated by a person.

The invention claimed is:

1. An information processing device for remotely operating an unmanned aircraft,
    wherein the unmanned aircraft comprises a camera and a directional microphone configured to pick up higher-quality sound within a sound pickup range having a predetermined angular range with respect to a specific direction than within an angular range outside the sound pickup range,
    wherein the specific direction is a direction in which the directional microphone faces, and
    wherein the information processing device comprises:
    a processor; and
    a memory that stores (i) a position and an orientation of the camera included in the unmanned aircraft, (ii) a position and an orientation of the directional microphone included in the unmanned aircraft and (iii) a program,
    wherein, when the program is executed by the processor, the program causes the processor to execute:
        storing, into the memory, (i) a captured image that is an image obtained by the camera of the unmanned aircraft and (ii) a sound collected by the directional microphone of the unmanned aircraft, and
        obtaining, from the memory, the captured image, the sound, the position and the orientation of the camera, and the position and the orientation of the directional microphone,
        calculating a sound pickup direction that is the direction in which the directional microphone faces when the captured image is obtained by the camera, the sound pickup direction being calculated using (i) the position and the orientation of the camera and (ii) the position and the orientation of the directional microphone,
        superimposing a first object indicating the sound pickup direction of the directional microphone at a position, on the captured image, corresponding to the sound pickup direction of the directional microphone calculated, when the sound pickup direction of the directional microphone calculated is included in an imaging range of the camera, and
        displaying, on a display, the captured image on which the object is superimposed,
    wherein the program further causes the processor to execute:
        establishing an association between a movement direction of the unmanned aircraft and the sound pickup direction; and
        controlling movement of the unmanned aircraft based on a result of the association.

2. The information processing device according to claim 1,
    wherein the program further causes the processor to execute
    obtaining a measured distance measured to a subject captured in the captured image,
    calculating a sound pickup range of the directional microphone at a position of the subject, using the sound pickup direction calculated and the measured distance obtained, and
    superimposing a third object indicating the sound pickup range calculated, on the captured image.

3. The information processing device according to claim 1,
    wherein the program further causes the processor to execute receiving an operation input relating to the movement of the unmanned aircraft, and controls the movement of the unmanned aircraft by converting the operation input based on the result of the association.

4. The information processing device according to claim 1,
    wherein when the sound pickup direction of the directional microphone calculated is not included in the imaging range of the camera, the program further causes the processor to execute superimposing, on the captured image, a second object indicating a direction in which the unmanned aircraft is to be rotated, without changing the imaging range of the camera, such that the sound pickup direction is included in the imaging range of the camera.

5. The information processing device according to claim 1,
    wherein the program further causes the processor to execute
    obtaining a setting distance corresponding to quality of sound pickup of the directional microphone, and
    controlling a presentation manner of the object indicating the sound pickup direction in accordance with a difference between the measured distance obtained to the subject in the captured image and the setting distance obtained.

6. The information processing device according to claim 5,
wherein the program further causes the processor to execute maintaining the presentation manner of the object indicating the sound pickup direction when the difference is greater than or equal to a threshold value or when a subject is not present in a range where the measured distance is measurable.

7. An information processing method used in an information processing device for remotely operating an unmanned aircraft,
wherein the unmanned aircraft comprises a camera and a directional microphone configured to pick up higher-quality sound within a sound pickup range having a predetermined angular range with respect to a specific direction than within an angular range outside the sound pickup range,
wherein the specific direction is a direction in which the directional microphone faces, and
wherein information processing device comprises:
a processor; and
a memory that stores (i) a position and an orientation of the camera included in the unmanned aircraft and (ii) a position and an orientation of the directional microphone included in the unmanned aircraft,
wherein the information processing method causes the processor to execute:
storing, into the memory, (i) a captured image that is an image obtained by the camera of the unmanned aircraft and (ii) a sound collected by the directional microphone of the unmanned aircraft;
obtaining, from the memory, the captured image, the sound, the position and the orientation of the camera, and the position and the orientation of the directional microphone;
calculating a sound pickup direction that is the direction in which the directional microphone faces when the captured image is obtained by the camera, the sound pickup direction being calculated using (i) the position and the orientation of the camera and (ii) the position and the orientation of the directional microphone;
superimposing a first object indicating the sound pickup direction of the directional microphone at a position, on the captured image, corresponding to the sound pickup direction of the directional microphone calculated, when the sound pickup direction of the directional microphone calculated is included in an imaging range of the camera; and
displaying, on a display, the captured image on which the object is superimposed,
wherein the information processing method further causes the processor to execute:
establishing an association between a movement direction of the unmanned aircraft and the sound pickup direction; and
controlling movement of the unmanned aircraft based on a result of the association.

8. A non-transitory computer-readable recording medium embodied with a computer program for a computer to remotely operate an unmanned aircraft,
wherein the unmanned aircraft comprises a camera and a directional microphone configured to pick up higher-quality sound within a sound pickup range having a predetermined angular range with respect to a specific direction than within an angular range outside the sound pickup range,
wherein the specific direction is a direction in which the directional microphone faces, and
wherein the computer comprises:
a processor; and
a memory that stores (i) a position and an orientation of the camera included in the unmanned aircraft and (ii) a position and an orientation of the directional microphone included in the unmanned aircraft,
wherein the program causes the processor to execute:
storing, into the memory, (i) a captured image that is an image obtained by the camera of the unmanned aircraft and (ii) a sound collected by the directional microphone of the unmanned aircraft;
obtaining, from the memory, the captured image, the sound, the position and the orientation of the camera, and the position and the orientation of the directional microphone;
calculating a sound pickup direction that is the direction in which the directional microphone faces when the captured image is obtained by the camera, the sound pickup direction being calculated using (i) the position and the orientation of the camera and (ii) the position and the orientation of the directional microphone;
superimposing a first object indicating the sound pickup direction of the directional microphone at a position, on the captured image, corresponding to the sound pickup direction of the directional microphone calculated, when the sound pickup direction of the directional microphone calculated is included in an imaging range of the camera; and
displaying, on a display, the captured image on which the object is superimposed,
wherein the program further causes the processor to execute:
establishing an association between a movement direction of the unmanned aircraft and the sound pickup direction; and
controlling movement of the unmanned aircraft based on a result of the association.

9. The information processing device according to claim 1,
wherein the program further causes the processor to execute
receiving, from the unmanned aircraft, (i) the position and the orientation of the camera included in the unmanned aircraft, (ii) the position and the orientation of the directional microphone,
wherein the storing further stores, into the memory, (i) the position and the orientation of the camera included in the unmanned aircraft, (ii) the position and the orientation of the directional microphone included in the unmanned aircraft.

* * * * *